United States Patent
Chen et al.

(10) Patent No.: US 10,088,388 B2
(45) Date of Patent: *Oct. 2, 2018

(54) ENGINE ERROR DETECTION SYSTEM

(71) Applicant: Tula Technology Inc., San Jose, CA (US)

(72) Inventors: Shikui Kevin Chen, San Jose, CA (US); Masaki Nagashima, Pacific Grove, CA (US); Li-Chun Chien, Milpitas, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,155

(22) Filed: Sep. 11, 2017

(65) Prior Publication Data

US 2017/0370804 A1 Dec. 28, 2017

Related U.S. Application Data

(63) Continuation-in-part of application No. 14/880,652, filed on Oct. 12, 2015, now Pat. No. 9,784,644.

(Continued)

(51) Int. Cl.
*G01M 15/11* (2006.01)
*F02D 35/02* (2006.01)
(Continued)

(52) U.S. Cl.
CPC ........... *G01M 15/11* (2013.01); *F02D 35/024* (2013.01); *F02D 41/0087* (2013.01);
(Continued)

(58) Field of Classification Search
CPC ..... F02D 2200/1012; F02D 2200/1015; F02D 35/024; F02D 41/0097; F02D 41/22; G01M 15/11
See application file for complete search history.

(56) References Cited

U.S. PATENT DOCUMENTS 4,434,767 A 3/1984 Kohama et al.
4,489,695 A 12/1984 Kohama et al.
(Continued)

FOREIGN PATENT DOCUMENTS

CN 1204003 1/1999
DE 10 2006 050597 7/2007
(Continued)

OTHER PUBLICATIONS

International Search Report dated Jan. 27, 2016 from International Application No. PCT/US2015/055145.
(Continued)

*Primary Examiner* — Freddie Kirkland, III
(74) *Attorney, Agent, or Firm* — Beyer Law Group LLP

(57) ABSTRACT

A variety of methods and arrangements for detecting misfire and other engine-related errors are described. In one aspect, a window is assigned to a target firing opportunity for a target working chamber. There is an attempt to fire a target working chamber during the target firing opportunity. A change in an engine parameter (e.g., crankshaft angular acceleration) is measured during the window. A model (e.g., a pressure model) is used to help determine an expected change in the engine parameter during the target firing opportunity. Based on a comparison of the expected change and the measured change in the engine parameter, a determination is made as to whether an engine error (e.g., misfire) has occurred.

26 Claims, 11 Drawing Sheets

Related U.S. Application Data

(60) Provisional application No. 62/064,786, filed on Oct. 16, 2014, provisional application No. 62/148,636, filed on Apr. 16, 2015.

(51) Int. Cl.
*F02D 41/22* (2006.01)
*F02D 41/00* (2006.01)

(52) U.S. Cl.
CPC .......... *F02D 41/22* (2013.01); *F02D 41/0097* (2013.01); *F02D 2200/1012* (2013.01); *F02D 2200/1015* (2013.01)

(56) References Cited

U.S. PATENT DOCUMENTS

| | | | |
|---|---|---|---|
| 4,509,488 A | 4/1985 | Forster et al. | |
| 5,278,760 A | 1/1994 | Ribbens et al. | |
| 5,355,713 A | 10/1994 | Scourtes et al. | |
| 5,377,631 A | 1/1995 | Schechter | |
| 5,377,720 A | 1/1995 | Stobbs et al. | |
| 5,490,486 A | 2/1996 | Diggs | |
| 5,537,963 A | 7/1996 | Hasebe et al. | |
| 5,581,022 A | 12/1996 | Sprague et al. | |
| 5,584,281 A | 12/1996 | Katoh | |
| 5,734,100 A | 3/1998 | Kishimoto et al. | |
| 5,753,804 A | 5/1998 | La Palm et al. | |
| 5,775,298 A | 7/1998 | Haller | |
| 5,791,314 A | 8/1998 | Ito | |
| 5,796,261 A | 8/1998 | Golab | |
| 5,803,040 A | 9/1998 | Biesinger et al. | |
| 6,006,157 A | 12/1999 | Dai et al. | |
| 6,023,651 A | 2/2000 | Nakayama et al. | |
| 6,158,411 A | 12/2000 | Morikawa | |
| 6,431,154 B1 | 8/2002 | Inoue | |
| 6,439,176 B1 | 8/2002 | Payne et al. | |
| 6,494,087 B2 | 12/2002 | Hatano et al. | |
| 6,584,951 B1 | 7/2003 | Patel et al. | |
| 6,591,666 B1 | 7/2003 | Kacewicz et al. | |
| 6,615,776 B1 | 9/2003 | Von Andrian-Werburg | |
| 6,619,258 B2 | 9/2003 | McKay et al. | |
| 6,655,353 B1 | 12/2003 | Rayl | |
| 6,691,021 B2 | 2/2004 | Takagi et al. | |
| 6,752,004 B2 | 6/2004 | Inada et al. | |
| 6,752,121 B2 | 6/2004 | Rayl et al. | |
| 6,782,865 B2 | 8/2004 | Rayl et al. | |
| 7,025,035 B1 | 4/2006 | Duty et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,257,482 B2 | 8/2007 | Yasui | |
| 7,314,034 B1 | 1/2008 | Waters et al. | |
| 7,357,019 B2 | 4/2008 | Mc Donald | |
| 7,395,813 B2 | 7/2008 | Pagot | |
| 7,458,346 B2 | 12/2008 | Gibson | |
| 7,484,484 B2 | 2/2009 | Frincke et al. | |
| 7,490,001 B2 | 2/2009 | Izelfanane | |
| 7,503,296 B2 | 3/2009 | Rozario et al. | |
| 7,503,312 B2 | 3/2009 | Surnilla et al. | |
| 7,546,827 B1 | 6/2009 | Wade et al. | |
| 7,577,511 B1 | 8/2009 | Tripathi et al. | |
| 7,595,971 B2 | 9/2009 | Ganev et al. | |
| 7,757,657 B2 | 7/2010 | Albertson et al. | |
| 7,762,237 B2 | 7/2010 | Gibson et al. | |
| 7,819,096 B2 | 10/2010 | McConville et al. | |
| 7,836,866 B2 | 11/2010 | Luken et al. | |
| 7,854,215 B2 | 12/2010 | Rozario et al. | |
| 7,900,509 B2 | 3/2011 | Feldkamp et al. | |
| 7,908,913 B2 | 3/2011 | Cinpinski et al. | |
| 7,918,210 B2 | 4/2011 | Gibson et al. | |
| 7,921,709 B2 | 4/2011 | Doering et al. | |
| 7,930,087 B2 | 4/2011 | Gibson et al. | |
| 7,942,039 B2 | 5/2011 | Huber et al. | |
| 7,946,262 B2 | 5/2011 | Borraccia et al. | |
| 8,006,670 B2 | 8/2011 | Rollinger et al. | |
| 8,091,412 B2 | 1/2012 | Forte et al. | |
| 8,099,224 B2 | 1/2012 | Tripathi et al. | |
| 8,103,433 B2 | 1/2012 | Hartmann et al. | |
| 8,181,508 B2 | 3/2012 | Cinpinski et al. | |
| 8,286,471 B2 | 10/2012 | Doering et al. | |
| 8,301,362 B2 | 10/2012 | Buslepp et al. | |
| 8,511,281 B2 | 8/2013 | Tripathi et al. | |
| 8,550,055 B2 | 10/2013 | Ferch et al. | |
| 8,601,862 B1 | 12/2013 | Bowman et al. | |
| 8,631,688 B1 | 1/2014 | Rayl et al. | |
| 8,666,641 B2 | 3/2014 | Rollinger et al. | |
| 8,667,835 B2 | 3/2014 | Doering et al. | |
| 8,826,891 B2 | 9/2014 | Nishikiori et al. | |
| 8,869,773 B2 | 10/2014 | Tripathi et al. | |
| 9,086,020 B2 | 7/2015 | Tripathi et al. | |
| 9,175,613 B2 | 11/2015 | Parsels et al. | |
| 9,212,610 B2 | 12/2015 | Chen et al. | |
| 9,399,963 B2 | 7/2016 | Loucks et al. | |
| 9,399,964 B2 | 7/2016 | Younkins et al. | |
| 9,482,202 B2 | 11/2016 | Carlson et al. | |
| 9,562,470 B2 | 2/2017 | Younkins et al. | |
| 9,891,137 B2 | 2/2018 | Chen et al. | |
| 2001/0047792 A1 | 12/2001 | Akazaki et al. | |
| 2002/0121252 A1 | 9/2002 | Payne et al. | |
| 2005/0033501 A1 | 2/2005 | Liu et al. | |
| 2005/0150561 A1 | 7/2005 | Flynn et al. | |
| 2005/0199220 A1 | 9/2005 | Osigo | |
| 2006/0129307 A1 | 6/2006 | Yasui | |
| 2008/0060427 A1 | 3/2008 | Hoshi et al. | |
| 2008/0092836 A1 | 4/2008 | Mutti et al. | |
| 2009/0158831 A1 | 6/2009 | Cornwell et al. | |
| 2009/0254242 A1 | 10/2009 | Kweon et al. | |
| 2010/0031738 A1 | 2/2010 | Feldkamp et al. | |
| 2010/0050993 A1 | 3/2010 | Zhao et al. | |
| 2010/0154738 A1 | 6/2010 | Tsukamoto et al. | |
| 2010/0175462 A1 | 7/2010 | Doering et al. | |
| 2010/0286891 A1 | 11/2010 | Huang et al. | |
| 2010/0288035 A1 | 11/2010 | Arakawa | |
| 2011/0072893 A1 | 3/2011 | Malacznski | |
| 2011/0167900 A1 | 7/2011 | Zanotti et al. | |
| 2012/0109495 A1 | 5/2012 | Tripathi et al. | |
| 2012/0143471 A1 | 6/2012 | Tripathi et al. | |
| 2012/0173122 A1 | 7/2012 | Nishikiori et al. | |
| 2012/0285161 A1 | 11/2012 | Kerns et al. | |
| 2012/0310505 A1 | 12/2012 | Morgan et al. | |
| 2013/0325290 A1 | 12/2013 | Pierik | |
| 2014/0041624 A1 | 2/2014 | Rayl et al. | |
| 2014/0261317 A1 | 9/2014 | Loucks et al. | |
| 2015/0192080 A1 | 7/2015 | Younkins et al. | |
| 2015/0377095 A1 | 12/2015 | Walther et al. | |
| 2016/0024981 A1 | 1/2016 | Parsels et al. | |
| 2016/0061127 A1 | 3/2016 | Chen et al. | |
| 2016/0109330 A1 | 4/2016 | Chen et al. | |
| 2017/0101956 A1 | 4/2017 | Younkins et al. | |

FOREIGN PATENT DOCUMENTS

| | | |
|---|---|---|
| DE | 10 2007 040117 | 2/2009 |
| DE | 10 2008 011614 | 6/2011 |
| JP | 2010-174857 | 8/2010 |

OTHER PUBLICATIONS

Written Opinion dated Jan. 27, 2016 from International Application No. PCT/US2015/055145.
International Search Report dated Jul. 8, 2014 from International Application No. PCT/US2014/026142.
Written Opinion dated Jul. 8, 2014 from International Application No. PCT/US2014/026142.
International Search Report dated Dec. 22, 2014 from International Application No. PCT/US2014/055902.
Written Opinion dated Dec. 22, 2014 from International Application No. PCT/US2014/055902.
International Search Report dated Aug. 12, 2015 from International Application No. PCT/US2015/029098.
Written Opinion dated Aug. 12, 2015 from International Application No. PCT/US2015/029098.

(56) References Cited

OTHER PUBLICATIONS

Shost et al., U.S. Appl. No. 15/171,931, filed Jun. 2, 2016.
Chinese Office Action dated Mar. 27, 2017 from Chinese Application No. 201480012932.6.
German Office Action dated Apr. 25, 2018 from German Application No. 11 2014 001 479.5.
Chinese Office Action dated Oct. 11, 2017 from Chinese Application No. 201480012932.6.

ENGINE ERROR DETECTION SYSTEM

CROSS-REFERENCE TO RELATED APPLICATIONS

This application is a Continuation-in-Part of U.S. patent application Ser. No. 14/880,652, entitled "Misfire Detection in a Dynamic Skip Fire Engine," filed Oct. 12, 2015, which claims priority of U.S. patent application Ser. No. 62/064,786, entitled "Misfire Detection in a Dynamic Skip Fire Engine," filed Oct. 16, 2014; and U.S. patent application Ser. No. 62/148,636, entitled "Engine Error Detection System," filed Apr. 16, 2015, each of which is incorporated herein in its entirety for all purposes.

FIELD OF THE INVENTION

The present invention relates generally to powertrain diagnostics. Various embodiments pertain to a misfire detection system and an adaptive model for detecting engine- or working chamber-related errors

BACKGROUND

Skip fire engine control is understood to offer a number of benefits including the potential of increased fuel efficiency. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

In this manner, even finer control of the effective engine displacement is possible. For example, firing every third cylinder in a 4 cylinder engine would provide an effective displacement of $1/3^{rd}$ of the full engine displacement, which is a fractional displacement that is not obtainable by simply deactivating a set of cylinders. Similarly, firing every other cylinder in a 3 cylinder engine would provide an effective displacement of ½, which is a fractional displacement that is not obtainable by simply deactivating a set of cylinders. U.S. Pat. No. 8,131,445 (which was filed by the assignee of the present application and is incorporated herein by reference in its entirety for all purposes) teaches a variety of skip fire engine control implementations.

When a cylinder is deactivated in a variable displacement engine, its valves are not actuated and although the piston typically still reciprocates, fuel is not combusted during the power stroke. Since the cylinders that are "shut down" don't deliver any net positive torque, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered and/or combusted during skipped working cycles when such valve deactivation mechanism is available. Often, no air is introduced to the deactivated cylinders during the skipped working cycles thereby reducing pumping losses. However, in other circumstances it may be desirable to trap exhaust gases within a deactivated cylinder, or to introduce, but not release air from a deactivated cylinder during selected skipped working cycles. In such circumstances, the skipped cylinder may effectively act as a gas spring. Although deactivating skipped cylinders is generally preferred, it should be appreciated that in some engines or during some working cycles it may not be possible, or in some situations desirable, to truly deactivate cylinders. When a cylinder is skipped, but not deactivated, intake gases drawn from the intake manifold are effectively pumped through the cylinder during the skipped working cycle.

Although the concept of skip fire control has been around for a long time, it has not traditionally been used in commercially available engines, so an additional challenge to implementing skip fire control is insuring that the engine's other engine/power train systems work effectively during skip fire control. One such system relates to engine diagnostics. As is well understood by those familiar with the art, modern vehicles incorporate engine management systems that perform in-situ diagnostics on various powertrain and vehicle component during vehicle operation. These diagnostic systems are often referred to as "On-Board Diagnostics" (OBD) systems and there are a number of engine diagnostic protocols that are performed while the engine is running. Modern OBD systems store and report a significant amount of information concerning the operation and state of health of various vehicle sub-systems including the powertrain. For example, some OBD systems are arranged to detect a situation in which a cylinder misfires i.e., when the cylinder fails to fire or there is incomplete combustion in the cylinder.

Although prior art OBD systems are well suited to detect misfire in a conventional all-cylinder engine control system, they are generally ill suited for use in a skip fire engine control system. Various embodiments of the present invention contemplate arrangements, methods and techniques for detecting misfire in an engine operated in a skip fire manner

SUMMARY

A variety of methods and arrangements for detecting misfire and other engine-related errors in an internal combustion engine are described. In one aspect, a window is assigned to a target firing opportunity for a target working chamber. In various embodiments, the window is related to the rotation of the crankshaft. There is an attempt to fire a target working chamber during the target firing opportunity. A change in an engine parameter (e.g., crankshaft angular acceleration or another crankshaft-related parameter) is measured during the window. A model (e.g., a multi-cylinder pressure model) is used to help determine an expected change in the engine parameter during the target firing opportunity. In various embodiments, the engine is operated in a dynamic firing level modulation manner where purposefully different air charges and corresponding fueling levels are associated with different firing opportunities. In other embodiments, an auxiliary power source adds or subtracts torque from the crankshaft in addition to the engine supplied torque. Based on a comparison of the expected change and the measured change in the engine parameter, a determination is made as to whether an engine- or working chamber-related error (e.g., misfire) has occurred. In various embodiments, the model is adjusted dynamically based on the measured change in the engine parameter to help improve the accuracy of the model.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
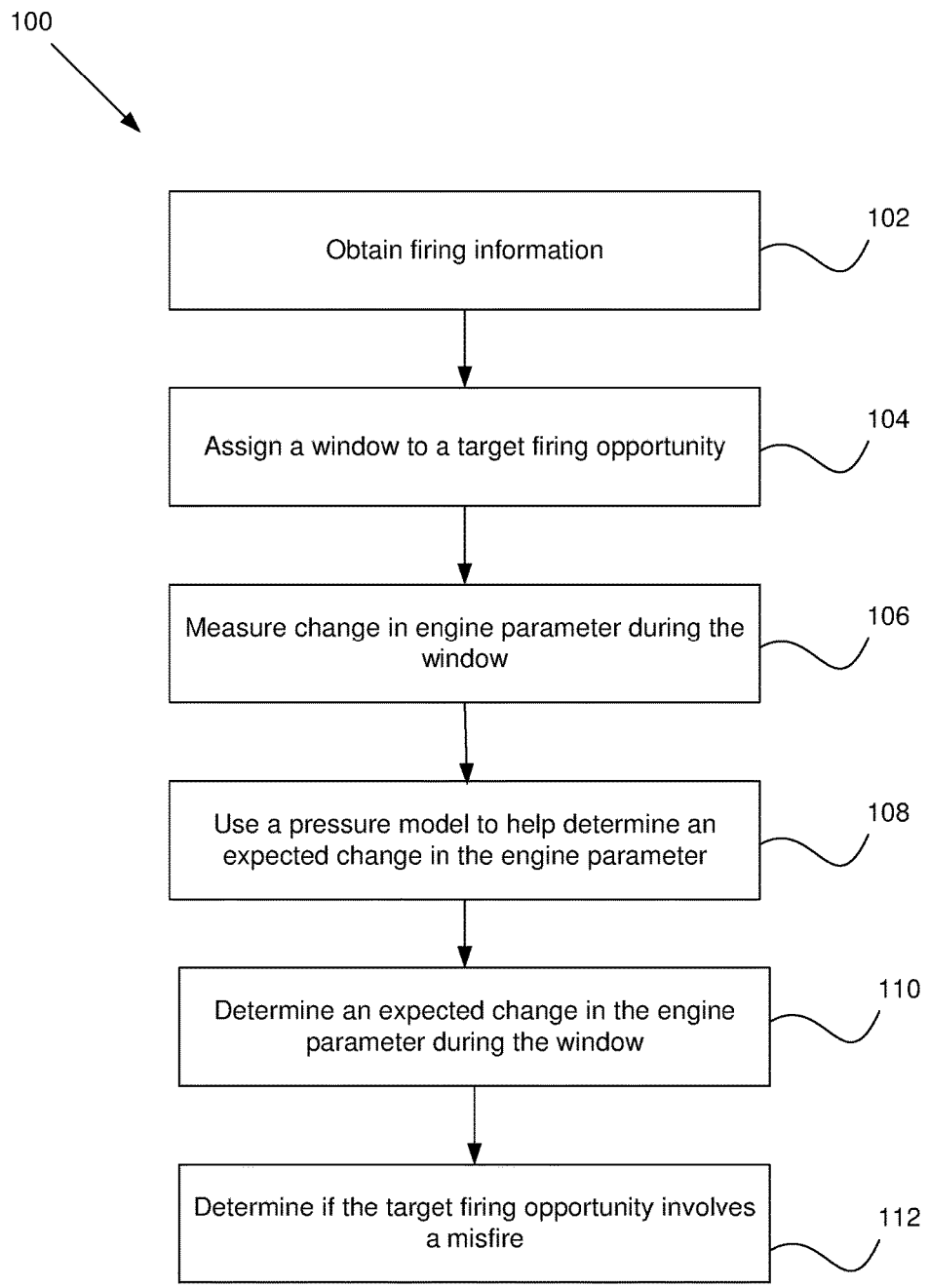
FIG. 1 is a flow diagram illustrating a method of detecting misfire in a skip fire engine control system according to a particular embodiment of the present invention.

The present invention relates to systems for detecting engine- and working chamber-related errors. More specifically, various embodiments of the present invention relate to techniques and arrangements for detecting misfire or other errors in skip fire engine control systems.

As noted in the background, prior art misfire detection systems are generally not suitable for detecting misfire in a dynamic skip fire engine control system. For example, various prior art misfire detection systems detect unexpected changes in the rotation speed of the crankshaft and use this to determine if a misfire has occurred. This works well in conventional, all cylinder engine operation, since it is expected that crankshaft acceleration will remain generally consistent. Although there are some variations in crankshaft acceleration from one firing to the next, the crankshaft acceleration peaks and profiles remain generally consistent in size and shape, in large part due to the fact that every cylinder is being fired. Thus, when a significant deviation in crankshaft acceleration is detected with respect to the firing of a particular cylinder, the misfire detection system may determine that the cylinder has misfired.

In dynamic skip fire engine operation, however, any working chamber or working cycle may be skipped. That is, a particular working chamber might be fired during one working cycle, skipped during the next, and fired or skipped during the next. As a result, the crankshaft acceleration peaks and profiles may abruptly change as the firing sequence changes, even though all working chambers are properly firing, i.e. no misfires. Unlike in prior art misfire detection systems, any substantial drop in crankshaft acceleration cannot be assumed to indicate a misfire, since in a skip fire engine control system, selected working cycles may be skipped at almost any time, each of which may also result in a drop in the crankshaft acceleration.

Conventional misfire determination systems also do not properly take into account the effect that the firing or skipping of various working chambers have on a measurement of crankshaft acceleration in a skip fire engine control system. To illustrate this point, consider an example in which a designated cylinder is examined for a possible misfire. Combustion takes place in the designated cylinder during an assigned window (e.g., during at least part of the combustion stroke for the designated cylinder.) The crankshaft acceleration is measured during that window. If the crankshaft acceleration dips below a predetermined threshold, it is determined that a misfire has occurred in the designated cylinder.

In skip fire engine operation, the accuracy of the misfire determination is improved if the misfire determination system and/or the misfire threshold takes into account the impact of the skipping or firing of other cylinders on the measured crankshaft acceleration. That is, the system should take into account the firing commands (i.e., skip or fire) for other cylinders that were executed prior to the window or will be executed after the window. It should be noted that while the firing of the designated cylinder may make the largest contribution to the crankshaft acceleration during the window, there are a number of other factors that affect crankshaft torque. For example, it requires energy to compress the intake air during the compression stroke and that energy comes from the crankshaft thereby acting as a negative torque on the crankshaft. Engines having multiple cylinders are generally designed with their working cycles out of phase with one another at consistent intervals so that the compression of one cylinder occurs while combustion is occurring in another cylinder. In normal, all cylinder operation, the torque generated by each firing, the torque required by each compression stroke, and other engine generated torques tend to be relatively constant during steady state operation. Therefore, the even spacing of the cylinder phases tend to result in each cylinder being affected in much the same way by events occurring in the other cylinders, which helps contribute to the consistency between the peaks and profiles associated with each firing opportunity during normal all-cylinder operation.

In skip fire operation, the effect of the other cylinders will not always be so consistent. For example, in some implementations the valves may be operated in a manner in which the intake and exhaust valves are opened in the normal sequence during "fired" working cycles and are both held closed through skipped working cycles. This will result in the torques applied to the crankshaft during each stroke of the working cycle being different during a skipped working cycle than would be seen during a fired working cycle. Most notably, during a skipped working cycle in which low pressure exhaust trapping is used, only a small amount of residual exhaust gases will remain in the cylinder and therefore the torque imparted during the compression stroke in a skipped working cycle will be quite different than the torque imparted during active (fired) working cycles because the relatively large negative torques required for compression of the intake gases will be missing during skipped working cycles. The trapped residual fraction can vary based on the valve timing and MAP influencing the imparted torque. Since the compression stroke associated with one cylinder will typically overlap with the combustion stroke of another, the net torque experienced by the crankshaft during any particular combustion event will be affected by the firing decisions of other cylinders. Although the compression stroke tends to have greatest impact, the differential torques experienced during the intake and exhaust strokes may also be different in significant ways. For example, holding the intake valve closed during the skipped working cycle may cause a very low pressure to be developed in the cylinder during intake thereby imparting a larger negative torque during the intake stroke of a skipped working cycle than would occur during intake of an active (fired) working cycle.

Still further, different skip fire controllers may have different valve actuation schemes and/or may use a combination of different valve actuation schemes and such valve actuation schemes can further affect the torque variations experienced by the crankshaft. For example, if an exhaust valve is not opened after a combustion event, a "high pressure exhaust gas spring" may effectively be created within the cylinder combustion chamber by the combustion gases and the timing of the exhaust valve opening may be delayed from immediately after the combustion event to a later working cycle. Such a high pressure spring will have a significant impact on the torque applied during all of the other strokes. In another example particularly relevant to direct injection engines, an intake valve may be opened in a working cycle in which no fueling or combustion occurs so that an air charge is trapped within the combustion chamber during a skipped working cycle. Such events will affect the net torque in yet another way. In still other circumstances, sometimes referred to as "re-exhaust", it may be desirable to open the exhaust valve in the normal course after the firing of a cylinder and then to reopen the exhaust valve in a subsequent skipped working cycle such as the one that immediately precedes an active (fired) working cycle resulting in an extra exhaust valve opening event. In still other implementations, re-exhaust may be employed at the end of every skipped working cycle. Of course, a variety of other valve actuation schemes may be applied as well and it should be apparent that the timing and magnitude of the torques applied to the crankshaft will depend on the state of all of the cylinders.

This application contemplates various techniques for taking into account at least some of the above factors in making a misfire determination in a skip fire engine control system. A particular embodiment contemplates a misfire detection system that detects misfires using a multi-cylinder pressure model. The pressure model is used to model the pressure in some or all of the working chambers during a target firing opportunity. In various implementations, the pressure model takes into account whether a working chamber is being fired or skipped, cylinder air charge due to cam phasing and intake manifold pressure, ignition timing adjustments and air fuel ratio variation. The pressure modeled for each working chamber is then used to help determine whether a particular working chamber is misfiring.

Figure 2:
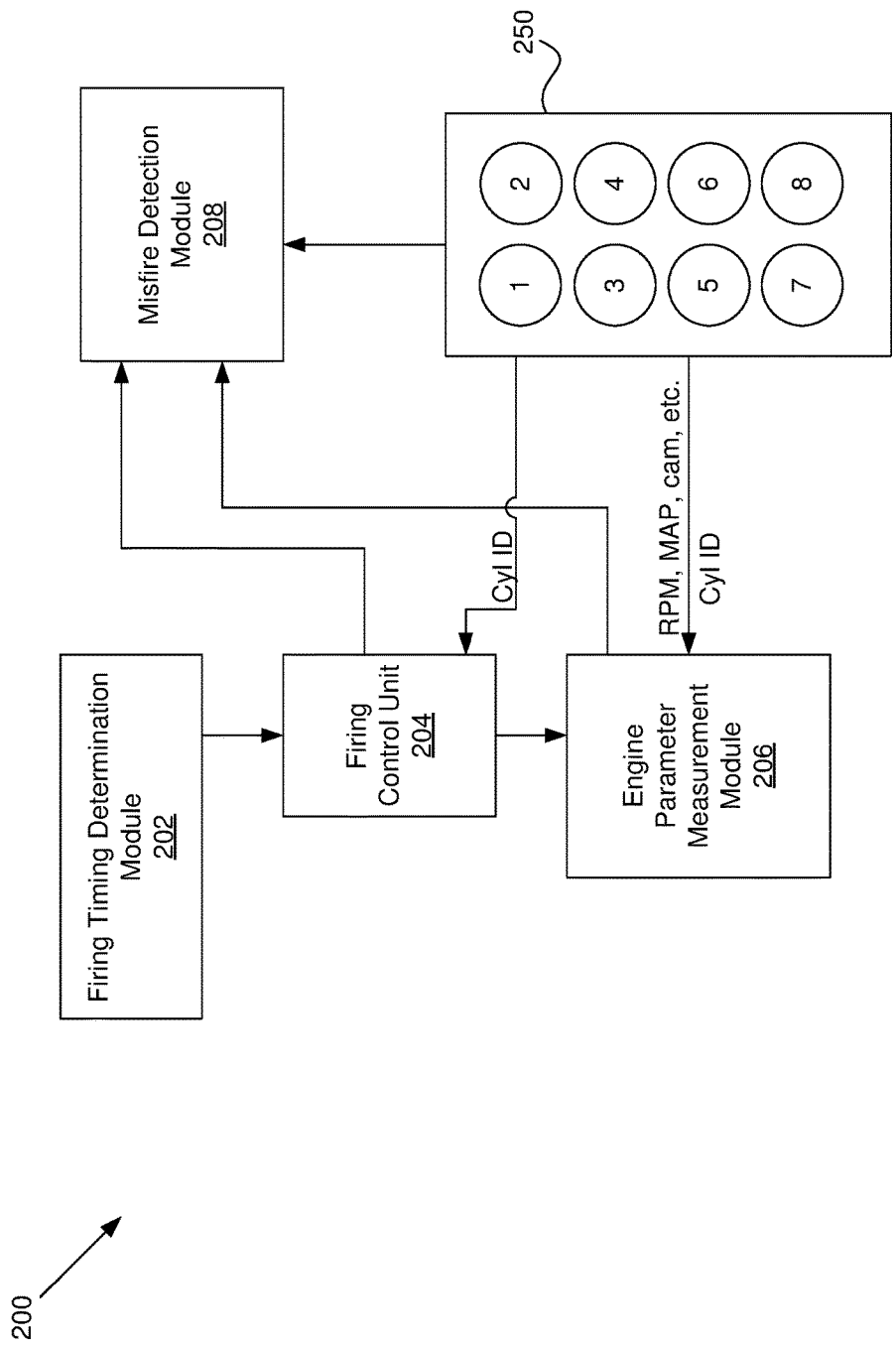
FIG. 2 is a block diagram of a misfire detection system according to a particular embodiment of the present invention.

Referring initially to FIGS. 1 and 2, an example method 100 and system 200 for detecting misfire using a multi-cylinder pressure model will be described. FIG. 1 is a flow diagram illustrating the steps of the method 100. The method 100 is implemented in the misfire detection system 200 illustrated in FIG. 2. The misfire detection system 200 includes a firing timing determination module 202, a firing control unit 204, an engine parameter measurement module 206, a misfire detection module 208, and an engine 250. FIG. 2 illustrates an engine 250 having eight cylinders, labeled 1 through 8, as the working chambers. Although engine 250 is shown having 8 cylinders arranged in two banks, engines having different numbers of cylinders arranged in different configurations may be used. Also, although a variety of discrete modules are illustrated in FIG. 2, it should be appreciated that in various embodiments, the modules may be combined and/or operations of one module may instead be handled by another module.

Initially, at step 102 of FIG. 1, firing information is obtained by the firing timing determination module 202 and/or the firing control unit 204. The firing timing determination module 202 is arranged to issue a sequence of firing commands used to operate the engine 250 in a skip fire manner and deliver a desired torque and/or firing fraction. The skip fire firing sequence may be determined in a wide variety of ways. For example, the firing sequence may be generated using a sigma delta converter or any suitable control algorithm. In some embodiments, the firing sequence is selected from a library of predefined firing sequences. The sequence of firing commands is transferred to the firing control unit 204.

The firing control unit 204 is arranged to orchestrate the firings of the working chambers of the engine 250 using the received firing sequence. The firing control unit 204 receives data identifying suitable working chambers from any suitable source (e.g., the engine 250) and matches a selected working chamber to each firing command Consider a simple example in which the firing control unit receives a short firing sequence of 0-1-0-0 from the firing timing determination unit 202, which indicates a skip, fire, skip and a skip, respectively. In this example, the engine may be configured so that the cylinder firing opportunities are arranged in a repeating sequence of 1-8-7-2-6-5-4-3. That is, the first cylinder to have a firing opportunity may be cylinder 1, followed by cylinder 8, and then cylinder 7, etc. The firing control unit 204 determines which cylinders should be matched to each firing command (e.g., it may determine that cylinders 1, 8, 7 and 2 should be skipped, fired, skipped and skipped, respectively, in accordance with the sequence.) Various embodiments of the present invention contemplates using such firing information (i.e., the firing sequence and the identities or numbers of the corresponding working chambers) to help detect misfires. Note that the fire/skip information is typically available before execution of a firing/skip command, since time is needed to fuel the cylinder and activate/deactivate the valves.

At step 104 of FIG. 1, the engine parameter measurement module 206 assigns windows to each firing opportunity. The window may be any suitable time period or interval that corresponds to a target firing opportunity of a target working chamber. A particular engine parameter will later be measured across the window to help determine if a misfire has occurred. The characteristics of the window may differ depending on the type of engine parameter measurement.

In one embodiment, for example, the engine parameter to be measured is crankshaft angular acceleration. The crankshaft angular acceleration tends to increase when combustion occurs in the target working chamber. As a result, a suitable window may be one that covers at least part of the power stroke for the target working chamber.

In another embodiment, the engine parameter to be measured is a combustion exhaust gas property. That is, one or more sensors in the exhaust system detect levels of oxygen or other components in an exhaust gas "pulse" that is generated during the firing opportunity. This analysis is used to help determine whether a misfire has occurred. This measurement may occur over a different window. Since exhaust gases are involved, the appropriate window may cover or correspond to at least a portion of the exhaust stroke of the target working chamber. Additionally, the window may also incorporate an offset to account for the time needed for the corresponding exhaust "pulse" to traverse from the exhaust valve to the exhaust sensor. Generally, the window may vary widely, depending on the characteristics of the misfire detection system 200. The exhaust sensor method of sensing misfires may be combined with the crankshaft acceleration method and other possible means of misfire detection.

Figure 3:
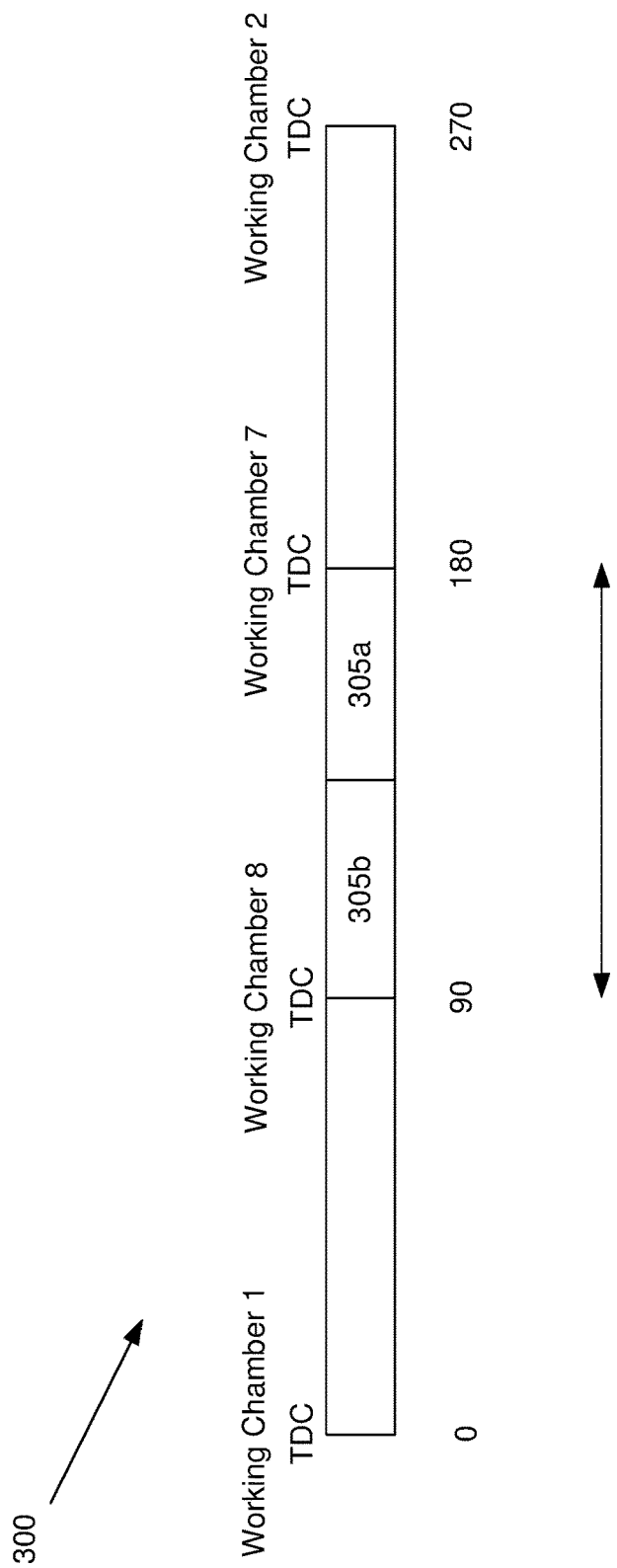
FIG. 3 is a block diagram of firing opportunities and associated angular window segments according to a particular embodiment of the present invention.

An example of an association between windows and firing opportunities for a corresponding working chamber is illustrated in FIG. 3. In this example, a total of 270° of rotation for the crankshaft of an eight cylinder, four-stroke engine is shown. During the rotation, there are three firing opportunities, corresponding to the firing or skipping of working chambers 1, 8 and 7. A window is assigned to each of the firing opportunities and working chambers. Each window is an angular window segment that corresponds to a 90° rotation of the crankshaft. FIG. 3 illustrates an example angular window segment 302, which corresponds to a firing opportunity for working chamber 8. The angular window segment 302 begins at or around the time the piston for the corresponding working chamber reaches top dead center (TDC) (e.g., at the beginning of a power stroke in a four stroke engine.) It should be appreciated that the above example is used for illustrative purposes and that the characteristics of the windows and the way in which they are assigned may vary for different applications. For example, it should be appreciated that windows longer or shorter than 90° rotation of the crankshaft rotation may used. The length of the window may vary with the number of cylinders in the engine. For example, longer windows may be used in engines with fewer cylinders, since there are fewer firing opportunities per engine revolution. Also, the time windows associated with each cylinder may overlap.

Returning to the flow diagram of FIG. 2, the engine parameter measurement module 206 measures a change in an engine parameter during the corresponding window (step 106 of FIG. 1) This measurement may be obtained, for example, using one or more sensors (e.g., a crankshaft position sensor, an exhaust gas sensor, etc.) The engine parameter measurement module 206 receives any input or engine parameter needed to perform the measurement, e.g. engine speed data, cylinder identity information, firing information from the firing timing determination module 202/firing control unit 204, etc. A variety of different engine parameters may be measured during the window. In some embodiments, for example, a crankshaft-related parameter or crankshaft angular acceleration is measured.

Below is one example formula for calculating crankshaft angular acceleration for the angular window segment 302 of working chamber 8 as shown in FIG. 3. In FIG. 3, the angular window segment 302 is divided into two subsegments, earlier subsegment 305b and later subsegment 305a. The example formula is as follows:

$$CrankshaftAngularAcceleration = \frac{AvgSpeed(305a) - AvgSpeed(305b)}{\Delta Time(305ab)}$$

where the AvgSpeed (305a) and AvgSpeed (305b) are the average velocities of the crankshaft over subsegments 305a and 305b, respectively, and Δ Time (305ab) refers to the time needed for the crankshaft to rotate from the midpoint of subsegment 305b to the midpoint of subsegment 305a. While the subsegments 305a and 305b are shown as having equal duration, this need not be the case. Also, the subsegments 305a and 305b need not be continuous, i.e. there may be a gap between the segments. The timing of the subsegments relative to the crankshaft rotation may be adjusted depending on the engine operating conditions and the misfire detection algorithm. In some cases more than two subsegments may be used. The subsegment durations and timing may vary depending on the engine operating conditions. The average engine speed may be determined by measuring the lapsed time between reference marks on the crankshaft passing a fixed reference point. In various embodiments, the crankshaft reference marks may be equally distributed around the crankshaft at approximately 6 degree intervals. The raw signal from crank angle may be processed to calculate the average speed in a subsegment, acceleration between subsegments, and the jerk (change in acceleration between pairs of subsegments). In various embodiments, measurement of jerk requires use of at least three subsegments, so that a change in acceleration may be measured. Higher order time derivatives of acceleration may also be used in misfire determination, with a concomitant increase in the number of subsegments. Another example method of calculating crank acceleration is to take a time derivative of raw engine speed (RPM) signal and apply a bandpass filter such as Type 1 Chebyshev filter. Various other filtering algorithms may be applied to the crank signal to improve the accuracy of all these measurements. Generally, the calculation of engine parameter change is performed for multiple firing events for each working chamber. Thus, the engine parameter measurement module builds a history of firing events for each working chamber, as well as corresponding engine parameter changes (e.g., crankshaft angular acceleration data) for the working chamber. This data is later used to help determine whether a particular working chamber is misfiring or not.

A variety of engine parameters may be measured in step 106. In some embodiments, as noted above, a crankshaft-related parameter, such as the crankshaft angular acceleration or its derivative (jerk), may be measured. In other embodiments, the engine parameter measurement involves an analysis of exhaust gases. For example, as previously discussed, various designs involve measuring a change in an amount of oxygen in the exhaust of the engine over a corresponding window or period of time. This change is associated with a particular target firing opportunity of a target working chamber. Such changes can provide insight into whether the target working chamber has misfired.

The misfire detection module 208 receives the firing information from the firing control unit 204 and/or the firing timing determination module 202 and the above engine parameter measurement data from the engine parameter measurement module 206. Returning to FIG. 1, at step 108, the misfire detection module 208 uses a pressure model to help determine an expected change in the engine parameter during the window. This expected change will later be compared with the change measured in step 106 to determine whether a misfire has occurred.

The pressure model is used to model a pressure within each of the working chambers of the engine during the window. In various embodiments, the misfire detection module 208 uses the modeled pressure to estimate the torque generated by the working chamber, which in turn can be used to help predict a change in the engine parameter (e.g., crankshaft acceleration) during the window. The modeling of pressure within multiple working chambers allows the misfire detection module 208 to take into account the different operational states of each of the working chambers, and their corresponding effects on the change in the engine parameter.

In skip fire engine control systems, the pressure within each cylinder may vary widely, depending in part on whether a particular working chamber has or will be skipped or fired. The skip/fire decision for each working chamber is in the firing information that the misfire detection module 208 receives from the firing control unit 204. The misfire detection module 208 is arranged to use this firing information to model the pressure within one, some or all of the working chambers during the window. Any suitable pressure model may be used. A particular implementation of a pressure model will be described in more detail later in the application.

The skipping or firing of a working chamber can have a large impact on the pressure dynamics within a working chamber during any given time interval. Consider the example of FIG. 3, in which during the window 302, working chamber 8 is being fired. In this example, the working chambers are fired or skipped in the order 1-8-7-2-6-5-4-3. The working cycles of the other working chambers are out of phase with the working cycle of working chamber 8 at consistent intervals. Accordingly, while working chamber 8 is in the first half of a power stroke, working chamber 1 is in the second half of its power stroke during the same target window 302. If working chamber 1 is being fired, the combustion process will tend to substantially increase the pressure in the working chamber. If working chamber 1 is skipped (e.g., using a low pressure spring), however, no combustion takes place and the pressure dynamics within the working chamber will be substantially different. The pressure model takes into account the different pressure effects of firing or skipping a working chamber.

Returning to FIG. 1, at step 110, based on the pressure model, the misfire detection module 208 determines an expected change in the engine parameter during the window. This step may be performed in any suitable manner. Various implementations, for example, involve modeling the pressure within each working chamber during a particular window and using the modeled pressure to estimate a torque generated by each working chamber. The modeling of the torque generated by each working chamber may be based on a wide variety of engine parameters that feed into the pressure model. The engine parameters may include, but not limited to, cam timing, engine speed, mass air charge, cylinder load and manifold absolute pressure. In various embodiments, the torque generated by all of the working chambers is summed and used to determine the expected change in the engine parameter (e.g., crankshaft acceleration) during the window. Additionally any torque loads arising from vehicle accessories, such as air conditioning, battery charging, etc., may be included in the overall torque model. Any suitable feature of the torque model and associated operations described in U.S. patent application Ser. No. 14/207,109, which is incorporated by reference herein in its entirety for all purposes, may also be used in method 100.

At step 112, the misfire detection module 208 determines whether a misfire occurred in the target working chamber during the target firing opportunity. In various embodiments, this determination involves comparing the change in the engine parameter measured in step 106 with the expected change in the engine parameter determined using the multi-cylinder pressure model (steps 108 and 110). Consider an example in which the engine parameter is crankshaft acceleration. If a misfire has taken place in the target working chamber, then combustion in the target working chamber was incomplete and the crankshaft angular acceleration should be reduced. In some embodiments, the misfire detection module 208 thus determines whether the measured change in crankshaft acceleration falls below the expected change in the crankshaft acceleration (i.e., as determined using the aforementioned multi-cylinder pressure model) by a predetermined amount. If so, the misfire detection module determines that a misfire has (possibly) taken place in the target working chamber. If not, the misfire detection module determines that a misfire has not taken place. It should be appreciated that the above approach is simplified and exemplary and that a wide variety of methods may be used to make this misfire determination, some of which will be described later in this application.

Figure 4:
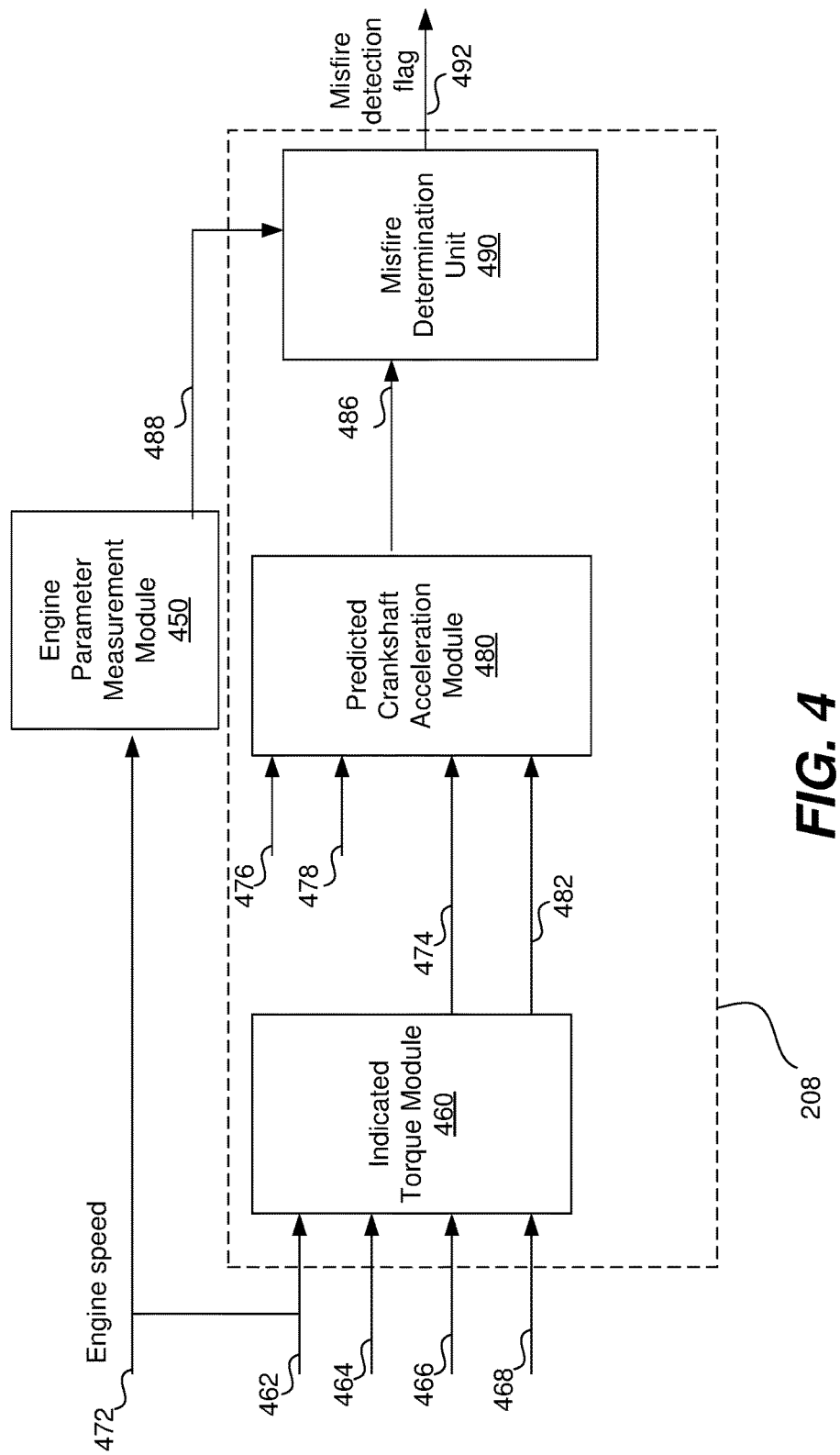
FIG. 4 is a block diagram of a misfire detection system according to a particular embodiment of the present invention.

The use of the pressure model (step 108), the determination of the expected change in the engine parameter (step 110) and the misfire determination (step 112) may be performed in a wide variety of ways. One approach is illustrated in FIG. 4. FIG. 4 is a block diagram illustrating a technique for calculating an expected change in crankshaft angular acceleration using a cylinder pressure model. FIG. 4 includes some of the modules illustrated in FIG. 2 i.e., the engine parameter measurement module 206 and the misfire detection module 208. In this example, the misfire detection module 208 includes various submodules i.e., an indicated torque module 460, a predicted crankshaft acceleration module 480 and a misfire determination unit 490. It should also be noted that input signal rationality checks may be performed in each module, in order to determine integrity of input signals to ensure robustness of the strategy.

In the illustrated embodiment, an analytical cylinder pressure model based on an ideal combustion stroke of an internal combustion engine is developed to estimate cylinder torque under a variety of operating conditions including the effects of skip fire operation (e.g., step 108 of FIG. 1.) The model is applicable to many types of engine cycles, such as Otto, Atkinson, Miller, Diesel, etc., using appropriate values that characterize the combustion event. The model predicts pressure in each cylinder not only during a fired cycle, but also during skipped cycles. The modeled cylinder pressure is then used to calculate the indicated torque based on a simple crank-slider mechanism.

Figure 5:
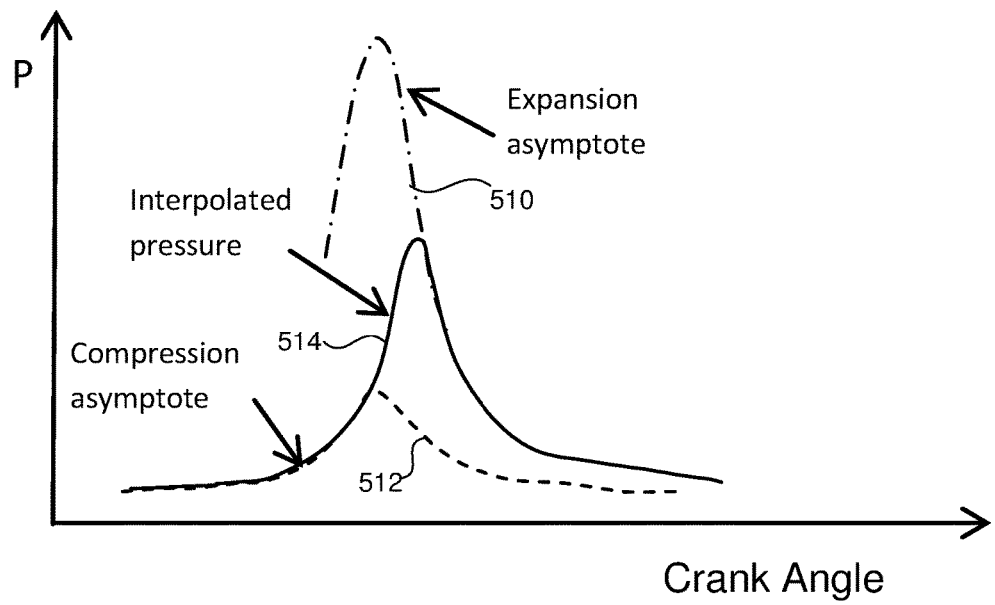
FIG. 5 is a graph of cylinder pressure as a function of crank angle according to a particular embodiment of the present invention.

In this example, a main concept of the analytical pressure model assumes that the cylinder pressure $p(\theta)$ modeled as the interpolation between two asymptotic pressure traces as illustrated in FIG. 5. The compression stroke 512 is modeled by a polytropic process characterized by a polytropic exponent $k_c$ and the thermodynamic state at intake valve closing (IVC). The reference states at IVC are determined from experimental data. These traces determine the compression asymptote up until ignition. The expressions for pressure and temperature for this process are $$p_c(\theta) = p_{IVC}\left(\frac{V_{IVC}}{V(\theta)}\right)^{k_c} \quad (1)$$

$$T_c(\theta) = T_{IVC}\left(\frac{V_{IVC}}{V(\theta)}\right)^{k_c-1} \quad (2)$$

Figure 6:
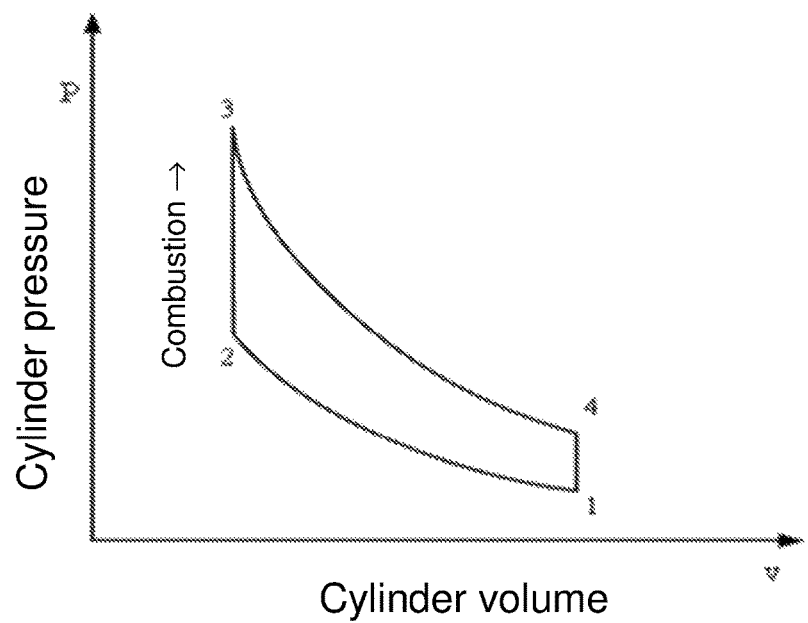
FIG. 6 is a graph of cylinder pressure as a function of cylinder volume according to a particular embodiment of the present invention.

The expansion asymptote 510 is also described by a polytropic process with polytropic exponent $k_e$. The quantities $p_3$, $T_3$ and $V_3$ correspond to point 3 in the ideal Otto cycle depicted in the pressure-volume (P-V) diagram shown in FIG. 6. The modeled combustion process moves between points 2 and 3 on the P-V diagram.

$$p_e(\theta) = p_3\left(\frac{V_3}{V(\theta)}\right)^{k_e} \quad (3)$$

$$T_e(\theta) = T_3\left(\frac{V_3}{V(\theta)}\right)^{k_e-1} \quad (4)$$

The temperature rise $\Delta T_{comb}$ due to combustion is added to $T_2$ and state) can be obtained from equation (1) and (2).

$$T_3 = T_2 + \Delta T_{comb} \quad (5)$$

$$p_3 = p_2 \frac{T_3}{T_2} \quad (6)$$

$$\Delta T_{comb} = \frac{m_f q_{HV} \varepsilon}{c_v m_{tot}} \quad (7)$$

Where fuel mass $m_f$, heating value $q_{HV}$, conversion efficiency $\varepsilon$, specific heat $c_v$, and total mass $m_{tot}$ are used.

The interpolation between two asymptotes is the interpolated pressure 514, based on the pressure ratio approach based on fitting heat release with the well-known Wiebe function described by parameters $\alpha$, start of combustion angle $\theta_{SOC}$, combustion duration $\Delta\theta$, and exponent m, which can be derived from experimental data. The pressure ratio is modeled by $$PR(\theta) = 1 - e^{-\alpha\left(\frac{\theta-\theta_{SOC}}{\Delta\theta}\right)^{m+1}} \quad (8)$$

This can then be used for the interpolation $$p(\theta) = (1-PR(\theta)) \cdot p_c(\theta) + PR(\theta) \cdot p_e(\theta) \quad (9)$$

The procedure above provides a simple and complete model for pressure between IVC (intake valve closure) and EVO (exhaust valve opening). The pressure during gas exchange may be set to the intake manifold pressure. However, for skipped cycles, the pressure will drop below intake manifold pressure during the intake stroke. To properly model the pressure evolution during a skipped cycle, a polytropic process referenced to either the BDC (bottom dead center) or the exhaust valve closing (EVC) may be used. The pressure at EVC (exhaust valve closing) for firing cycles may be derived from experimental data.

$$p(\theta) = p_{EVC}\left(\frac{V_{EVC}}{V(\theta)}\right)^{k_c} \quad (10)$$

Figure 7:
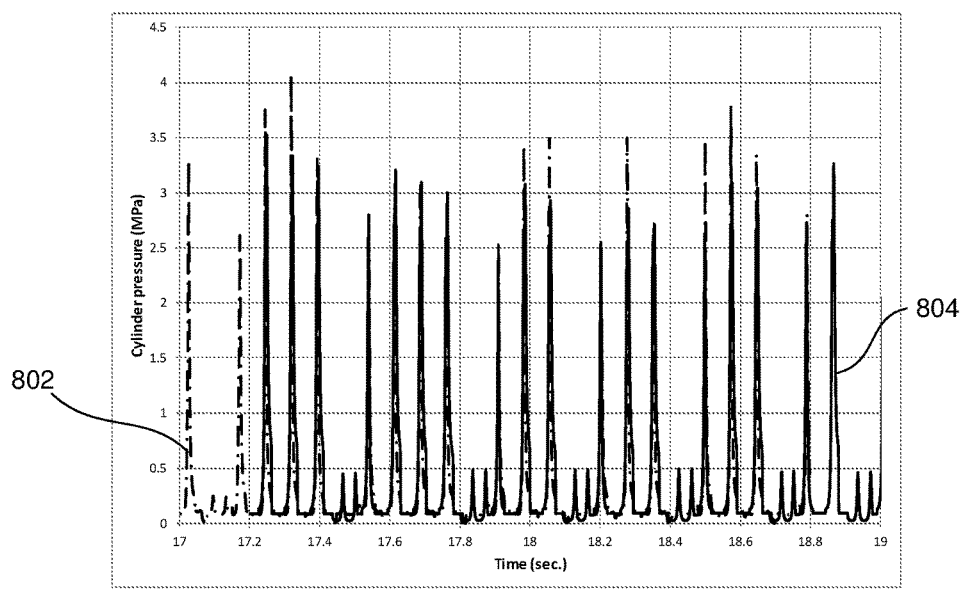
FIG. 7 is a graph comparing a modeled cylinder pressure and a measured cylinder pressure according to a particular embodiment of the present invention.

A comparison of the modeled cylinder pressure 804 with the measured cylinder pressure 802 is shown in FIG. 7. The pressures during skipped cycles as well as the firing cycles are captured well enough for accurate torque prediction as described next. For clarity the initial section of curve 804 (solid line) is omitted and the final section of curve 802 (dashed line) is omitted. Inspection of FIG. 7 shows that the model works well in predicting the cylinder pressure.

The gas force acting on a piston connected to the crank shaft by a rod with a crank slider mechanism produces at each instant an "indicated torque"

$$T_{cyl,i}(\theta) = (P_{cyl,i}(\theta) - P_{crank})Ar\frac{\sin(\theta+\beta)}{\cos\beta} \quad (11)$$

$$\beta = \sin^{-1}\frac{\delta + r\sin(\theta-\varphi)}{l} \quad (12)$$

$$\varphi = \sin^{-1}\frac{\delta}{(r+l)} \quad (13)$$

where $p_{crank}$, r, $\delta$, l and A are crankcase pressure, crank radius, pin offset, connecting rod length and piston face cross-section area, respectively. The resultant engine indicated torque is just sum of the contributions from each cylinder.

$$T_i(\theta) = \Sigma_{Namcyl} T_{cyl,i}(\theta) \quad (14)$$

The indicated torque may be determined using the methods described above in the Indicated Torque Module 460 (FIG. 4). Inputs to the Indicated Torque Module 460 include engine operating conditions 462, hardware parameters 464, combustion parameters 466, and a cylinder deactivation flag 468. Engine operating conditions 462 may include engine speed 472, intake manifold absolute pressure (MAP), intake manifold air temperature, air per cylinder, cam phasing, and other variables. Hardware parameters 464 may include connecting rod length, compression ratio, valve opening window, pin offset and other design parameters. Combustion parameters 466 may include injection timing, spark timing, heat release characteristics during combustion and other parameters describing the combustion details. The cylinder deactivation flag 468 describes whether a cylinder is being fired or skipped.

The indicated engine torque 474 obtained from using the cylinder pressure model by the Indicated Torque Module 460 may be used to determine crank angular acceleration in the Predicted Crank Acceleration Module 480 (e.g., step 110 of FIG. 1.) The engine dynamic model used for this derivation is $$J_{eq}\ddot{\theta} + M_{eq}r^2\left[f_1(\theta)\ddot{\theta} + f_2(\theta)\dot{\theta}^2\right]f_3(\theta) = T_i(\theta) - T_{fp}(\theta) - T_L(\theta) \quad (15)$$

where $$f_1(\theta) = f_3(\theta) = \sin\theta + \frac{r}{2l}\sin 2\theta \quad (16)$$

$$f_2(\theta) = \cos\theta + \frac{r}{l}\cos 2\theta. \quad (17)$$

$\theta$ is the crank angle, $\dot{\theta}$ and $\ddot{\theta}$ are the angular velocity and the angular acceleration of the crankshaft, respectively. l is the connecting rod length, and r is the crank radius. $J_{sq}$ is the moment of inertia of the crankshaft, flywheel, gear and rotating part of connecting rod, and $M_{sq}$ is the mass of the piston, rings, pin and linear motion part of the connecting rod. $T_i(\theta)$, $T_{fp}(\theta)$, and $T_L(\theta)$ are the indicated engine torque 474, friction torque 482, and load torque 476, respectively. Other inputs 478, such as accessory loads, may be considered in Eq. (15). The derivation of this equation can be found in the literature, for example Zweiri, et. al. "Instantaneous friction components model for transient engine operation", Proc. Inst. Mech. Eng. Part J. Automob. Eng. Vol. 214, no.7 pp. 809-824, July 2000.

The crank angle $\theta$, crank angular velocity $\dot\theta$, and equivalent mass $M_{sq}$ may be measured, and the indicated engine torque $T_i(\theta)$ 474 is given by the model previously described. The friction torque $T_{fp}(\theta)$ 482 may be determined by a lookup table obtained from experiments which relates the crank RPM to friction torque. The combined moment of inertia of crankshaft, flywheel, gear, and rotating part of connecting rod, $J_{sq}$, may also be determined experimentally for each gear. The load torque $T_L(\theta)$ 476 may be estimated from the difference between the engine speed and turbine shaft speed through equation (18) for the torque converter and torque converter clutch. $T_p$ is the torque converter torque and $T_{tCC}$ is the torque converter clutch torque. $K_i$ is calculated by a lookup table obtained from experiments and torque converter clutch gain $K_{tCC}$ and a constant $\alpha$ may also be determined experimentally.

$$T_L = T_p + T_{tcc} \quad (18)$$

$$T_p = \frac{\omega_e - \omega_t}{|\omega_e - \omega_t|} \frac{\omega_e^2}{K_i^2}$$

$$T_{tcc} = K_{tcc} \tanh\left(\frac{\omega_e - \omega_t}{\alpha}\right)$$

The variables $\omega_e$ and $\omega_t$ are the angular speed of crankshaft and turbine shaft, respectively. A discrete-time low-pass filters may be applied to $T_p$ and $T_{tCC}$ to remove high frequency components. The low-pass filter may be given by the following transfer function $$F(z) = \frac{b}{z-a} \quad (19)$$

where a and b are filter constants.

Equation (15) may be solved for $\ddot\theta$ using the measured crank angular velocity $\dot\theta$ via $$\ddot\theta = \frac{1}{J_{eq} + M_{eq}r^2 f_1 f_3}\left[-M_{eq}r^2 f_2 f_3 \dot\theta^2 + T_i(\theta) - T_{fp}(\theta) - T_L(\theta)\right] \quad (20)$$

The predicted crank acceleration 486 obtained by the Predicted Crankshaft Acceleration Module 480 using the model described above may be compared with the measured crank angular acceleration 488 determined by the Engine Parameter Measurement Module 206 (e.g., step 106 of FIG. 1). Measured crank acceleration 488 may be computed from the measured crank angular speed in the 6-degree angle domain, where the crank angular speed is sampled at every 6 crank angle degrees, by the following formulae to obtain the derivative and also reduce the effect of measurement noise.

$$A_{time}(n) = \frac{\frac{42}{\sum_{k=1}^{7} T_d(n-k)} - \frac{42}{\sum_{k=8}^{14} T_d(n-k)}}{\sum_{k=4}^{10} T_d(n-k)} \quad (21)$$

$$T_d(n) = \frac{6}{360 \cdot \frac{r(n)}{6}} = \frac{1}{10}\frac{1}{r(n)} \quad (22)$$

r(n) is the crank angular speed at time step n in 6 degree angle domain. The acceleration formulae (21) can also be approximated as the double average of acceleration shown below.

$$A_{rpm}(n) = \frac{\frac{1}{7}\sum_{k=1}^{7} r(n-k) - \frac{1}{7}\sum_{k=8}^{14} r(n-k)}{\sum_{k=4}^{10} T_d(n-k)} = \frac{1}{7}\sum_{k=1}^{7}\frac{1}{7}\sum_{m=0}^{6} a(n-k-m) \quad (23)$$

Figure 8:
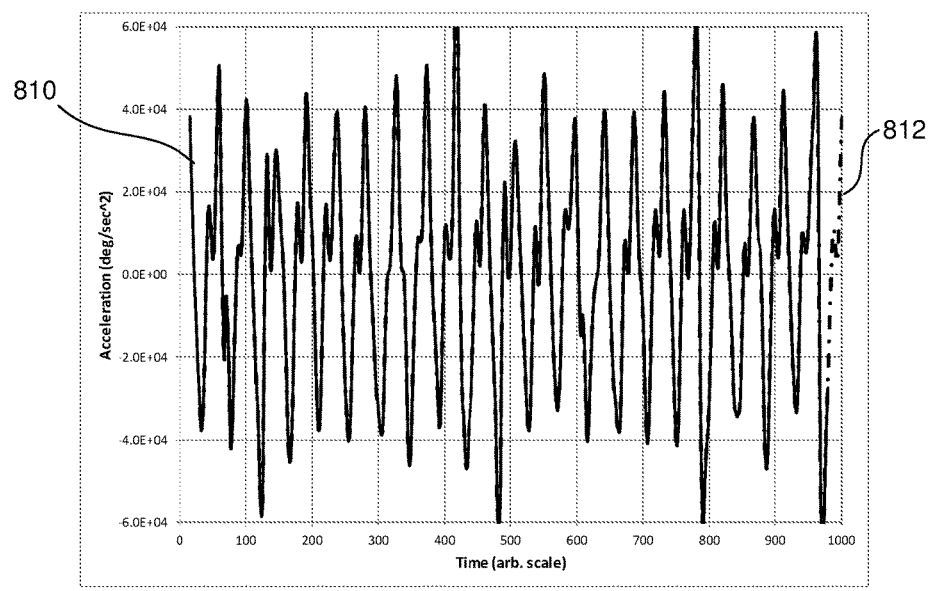
FIG. 8 is a graph of crankshaft acceleration as a function of time according to a particular embodiment of the present invention.

Here the term $T_d(n)$ is treated as a constant during the time steps considered and Euler's rule is used to derive the relationship between r(n) and the acceleration a(n). FIG. 8 plots the crank shaft acceleration versus time for an engine running under substantially steady-state conditions. FIG. 8 compares the two averaging methods, that based on Eq. (21), curve 810, and that based on Eq. (23), curve 812, applied to the same angular speed signal generated for validation purposes. The peaks in the curves 810 and 812 correspond to cylinder firings and the dips correspond to skipped firing opportunities. For clarity the initial section of curve 812 (dashed line) is omitted and the final section of curve 810 (solid line) is omitted. Inspection of FIG. 8 illustrates that the difference between the two methods is negligible. This comparison demonstrates that the acceleration obtained from the engine dynamics model can be filtered in 6-degree domain and can be compared with the measured acceleration obtained from Eq. (21).

A high-pass filter may then be applied to both measured and modeled accelerations. The high-pass filter removes any mean value offset errors that may be present in the acceleration estimate, making it easier to compare the characteristics of the measured and simulated accelerations relevant for high pressure exhaust spring detection. The high-pass filter may be given by $$y(z) = -a_1 y(n-1) - a_0 y(n-2) + b_2 x(n) + b_1 x(n-1) + b_0 x(n-2). \quad (24)$$

where $a_0$, $a_1$, $b_0$, $b_1$, and $b_2$ are the appropriate filter coefficients determined by experimental data. Based on the comparison of the measured and modeled accelerations, the misfire detection module determines whether a misfire took place (e.g., step 112 of FIG. 1.)

The misfire detection module may use a wide variety of techniques to determine whether a misfire took place (step 112. In some embodiments, for example, the misfire determination is based at least in part on the following formula:

$$X = \frac{A-B}{A}$$

where A is the expected change in the engine parameter (e.g., as determined in step 110) and B is the measured change in the engine parameter (e.g., as determined in step 106). If the value X exceeds a particular predefined threshold, then the misfire determination module determines that a misfire has (possibly) occurred. If the value X does not exceed the predefined threshold, then the misfire determination module determines that a misfire has not occurred.

In some applications, the accuracy of the misfire determination process may be improved by adjusting the above formula as follows:

$$X = \left(\frac{A-B}{A'} + k\right)^Z$$

where A' is a low-pass filtered mean of A. A' can also be an expected change in the engine parameter and may be directly proportional to mass air charge per working chamber. Z is any suitable exponent e.g., in some applications, Z=3 works well. k is a predefined threshold such that the value of X of 1 or greater indicates a possible misfire, and the value of X of less than 1 indicates that a misfire has not occurred. In some implementations, it has been determined that above adjustments can help reduce the amount of error caused by the complexity of the pressure model and/or improve the accuracy of the misfire determination process.

Generally, when an instance of misfire is detected for a particular working chamber in which the aforementioned misfire threshold is exceeded, the information is stored in an additional module not shown in FIG. 4 in which a misfire counter for that working chamber is incremented. Typically, multiple firing events are monitored in order to confirm that a working chamber has misfired. In some embodiments, for example, the above misfire determination techniques are executed for many, almost all, or all firing events. Generally, a firing event involves an attempt to actually fire a working chamber, as opposed to the skipping of the working chamber. Each firing event is associated with the identity of a particular working chamber and data indicating whether the misfire threshold had been exceeded. This information is used to build a database of firing events. Thus, the misfire detection module 208 stores a history for each working chamber that indicates the number of firing events in which the misfire threshold was exceeded. In some embodiments, if a particular working chamber is associated with multiple firing events of which at least a predetermined percentage or number involves the exceeding of a misfire threshold, a determination is made that the working chamber is misfiring and the appropriate error signal is communicated to the vehicle driver via the OBD system, typically a malfunction indicator lamp on the vehicle dashboard. An appropriate error code may also be sent to the OBD interface for subsequent diagnostic evaluation.

It should be appreciated that the misfire determination process is not limited to the aforementioned formulas, and that any suitable technique for determining misfire may be used. In various embodiments, for example, an adjusted version of the above formulas is used e.g., the misfire determination involves exponentiation of a value based on A, B and A', but the value and the aforementioned variables or formulas may be further adjusted in various ways not explicitly described above.

After a particular working chamber is determined to be misfiring as indicated above, additional steps may be taken. Such steps include but are not limited to the skipping of the misfiring working chamber, the displaying of an alert and the use of a fixed firing sequence. These and other steps are described in co-assigned U.S. patent application Ser. No. 14/207,109 (hereinafter referred to as the '109 application), which is incorporated herein in its entirety for all purposes. Any of the above techniques described in the '109 application may be performed after the steps of method 100 of FIG. 1 are performed.

The arrangements and techniques described in FIGS. 1-4 can be used for a variety of applications. In various embodiments, the illustrated misfire detection system 200 (FIG. 2) is stored in an engine control unit of a vehicle and/or is part of an onboard diagnostics system. In other embodiments, it may be stored in an external diagnostic device that is used to examine the performance of an engine. Any of the aforementioned modules, systems and operations may be stored in the form of hardware, software or both.

Figure 9:
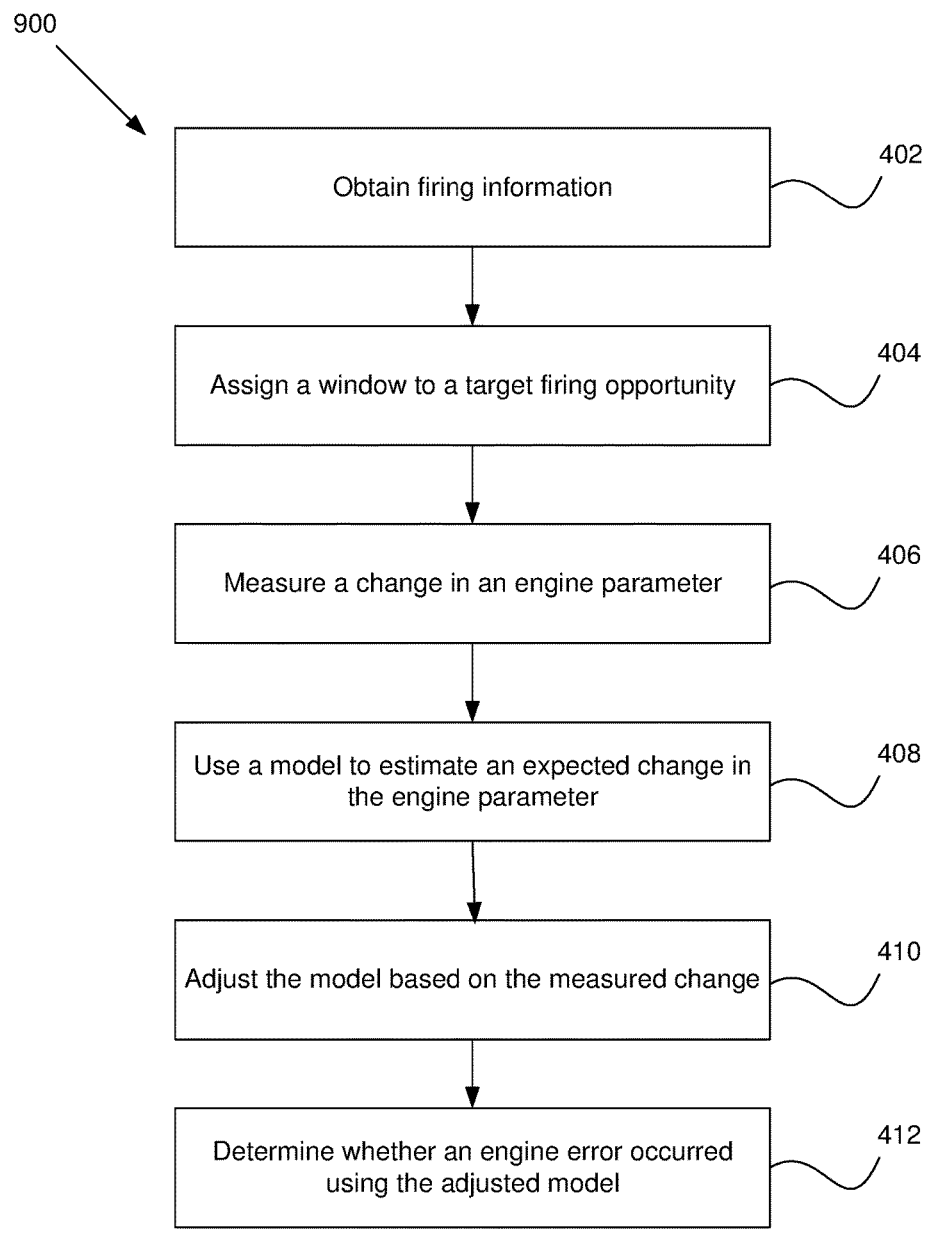
FIG. 9 is a flow diagram illustrating a method of detecting an engine error using an adaptive model according to a particular embodiment of the present invention.

Referring next to FIG. 9, an example method 900 for using an adaptive model will be described. As discussed above in connection with method 100 of FIG. 1, for various applications, it is useful to use a model (e.g., a pressure or torque model) to estimate a change in an engine parameter (e.g., crankshaft acceleration) during a particular window. This estimate may be used to help determine whether any engine errors have taken place. However, in some cases, possibly due to unforeseen conditions and the various assumptions that the model is based on, the estimate provided by the model may be inaccurate. For example, as an engine ages leakage past the piston rings and valve seats may impact the pressures and associated torque generated by a cylinder. To improve the accuracy of the model, the engine parameter is measured during the same window and the model is adjusted based on the measurement. Method 900 describes an example of this approach. The techniques described in method 900 may be applied to any of the aforementioned methods (e.g., method 100 of FIG. 1) and may be performed in skip fire or conventional engine control systems.

Initially, at step 402, firing information is obtained. At step 404, a window is assigned to a target firing opportunity. At step 406, a change in an engine parameter (e.g., crankshaft acceleration) is measured. At step 408, a model is used to estimate an expected change in the engine parameter. The model may be any suitable model used to estimate a change in the engine parameter (e.g., a model that estimates pressure within and/or torque generated by each working chamber as described in method 100 of FIG. 1, FIG. 4, etc.) Steps 402, 404, 406 and 408 may be performed in the same manner as steps 102, 104, 106 and 108 of FIG. 1, respectively.

At step 410, the model is adjusted based on a comparison between the expected change in the engine parameter (step 408) and the measured change in the engine parameter (step 406). In various embodiments, this adjustment is only performed when the difference between the expected change and the measured change exceeds a predefined threshold. The adjustment may be performed in a variety of ways. In some embodiments, for example, when steps 406 and 408 are repeated at a later time, a multiplier is applied to the expected change determined using the model. The multiplier reduces the offset between the measured and expected values. Put another way, when step 408 is repeated and the model generates another estimate of an expected change in the engine parameter, the estimate is adjusted to bring it more in line with a corresponding measurement of the engine parameter.

Figure 10:
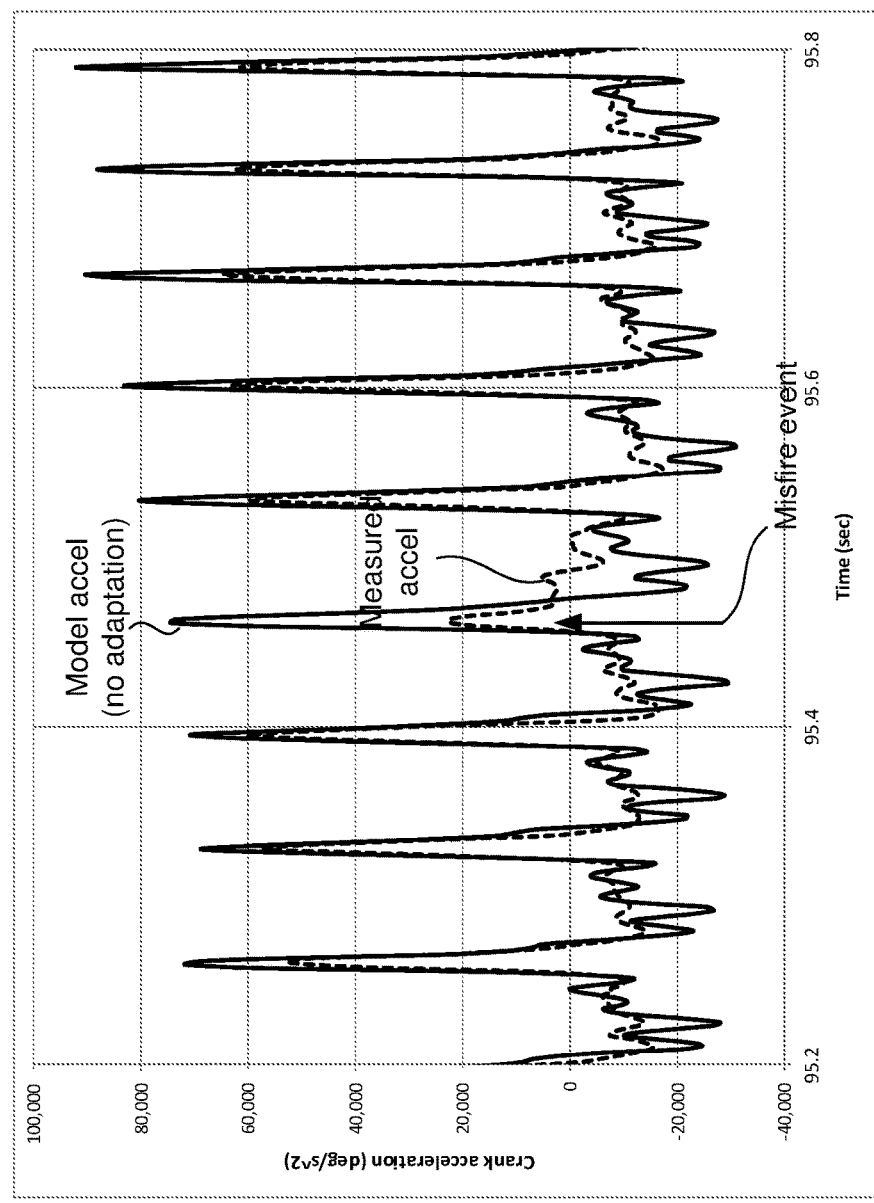
FIG. 10 is a graph comparing modeled and measured crankshaft acceleration using a model according to a particular embodiment of the present invention.
Figure 11:
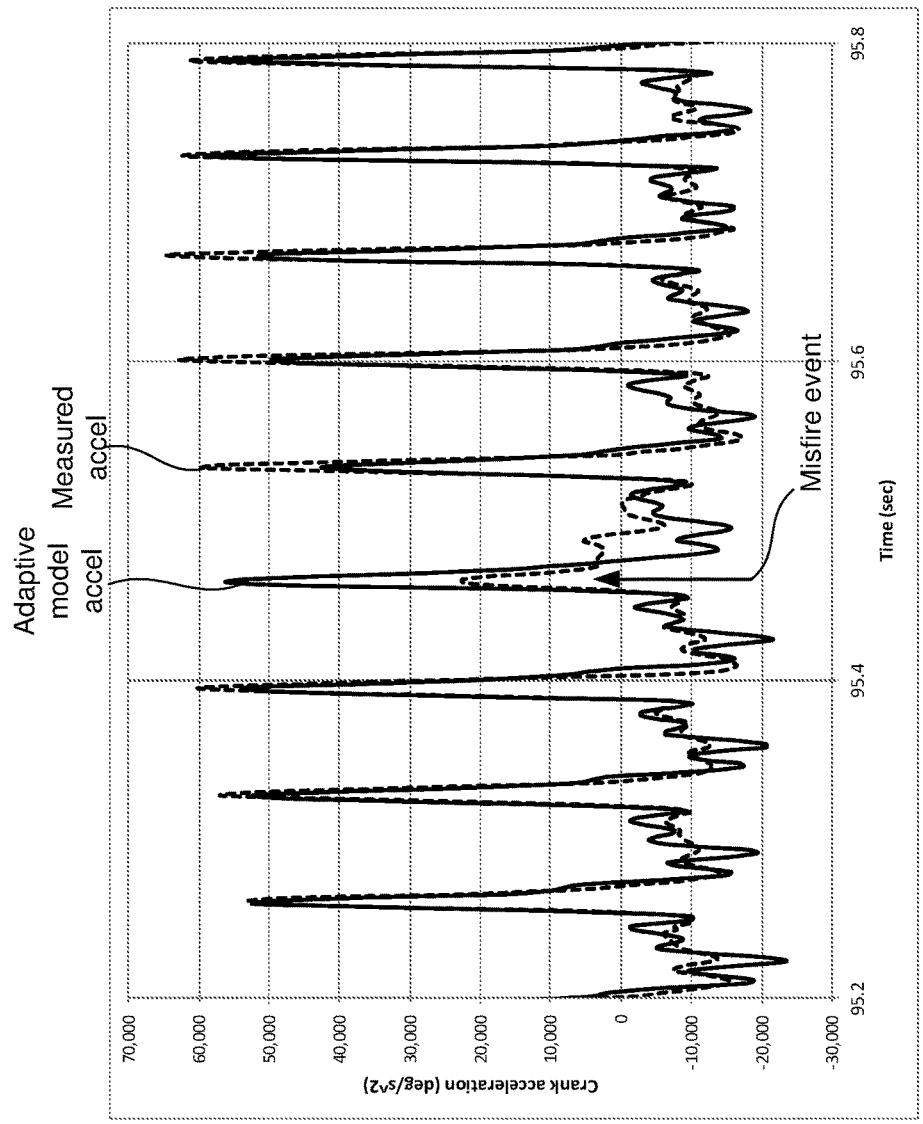
FIG. 11 is a graph comparing modeled and measured crankshaft acceleration using an adaptive model according to a particular embodiment of the present invention.

An example of this approach is illustrated in FIGS. 10 and 11. FIG. 10 is a graph illustrating crankshaft acceleration as a function of time in an example implementation of the aforementioned model. In the illustrated embodiment of FIG. 10, the model has not been adjusted based on the measurements performed in step 406. The solid line curve indicates the crankshaft acceleration over time as estimated using the model. The dotted line curve indicates measurements of the crankshaft acceleration over time. The graphs indicate a mismatch between the dotted line and solid line curves. That is, the crankshaft acceleration estimated by the model tends to significantly overshoot the measured crankshaft acceleration.

In FIG. 11, the model is adjusted as described in step 410 based on a comparison of the results illustrated in FIG. 10. In FIG. 11, the difference between the expected and measured changes in the crankshaft acceleration are thus significantly reduced. That is, the solid line curve (which represents the crankshaft acceleration estimated by the model) more closely approximates the dotted line curve (which represents the measured crankshaft acceleration.) Put another way, the offset between the expected engine parameter change (e.g., from step 408) generated by the model and the measured engine parameter change (e.g., from step 406) has been reduced. It should be appreciated that this approach does not cause a problem in detecting an engine error, such as a misfire event, which is marked in the graph. At that point in time, the measured crankshaft acceleration is much lower than what was predicted by the model. This difference may be used to identify a possible misfire (e.g., as previously discussed in connection with steps 108 and 110 of FIG. 1.)

Figure 12:
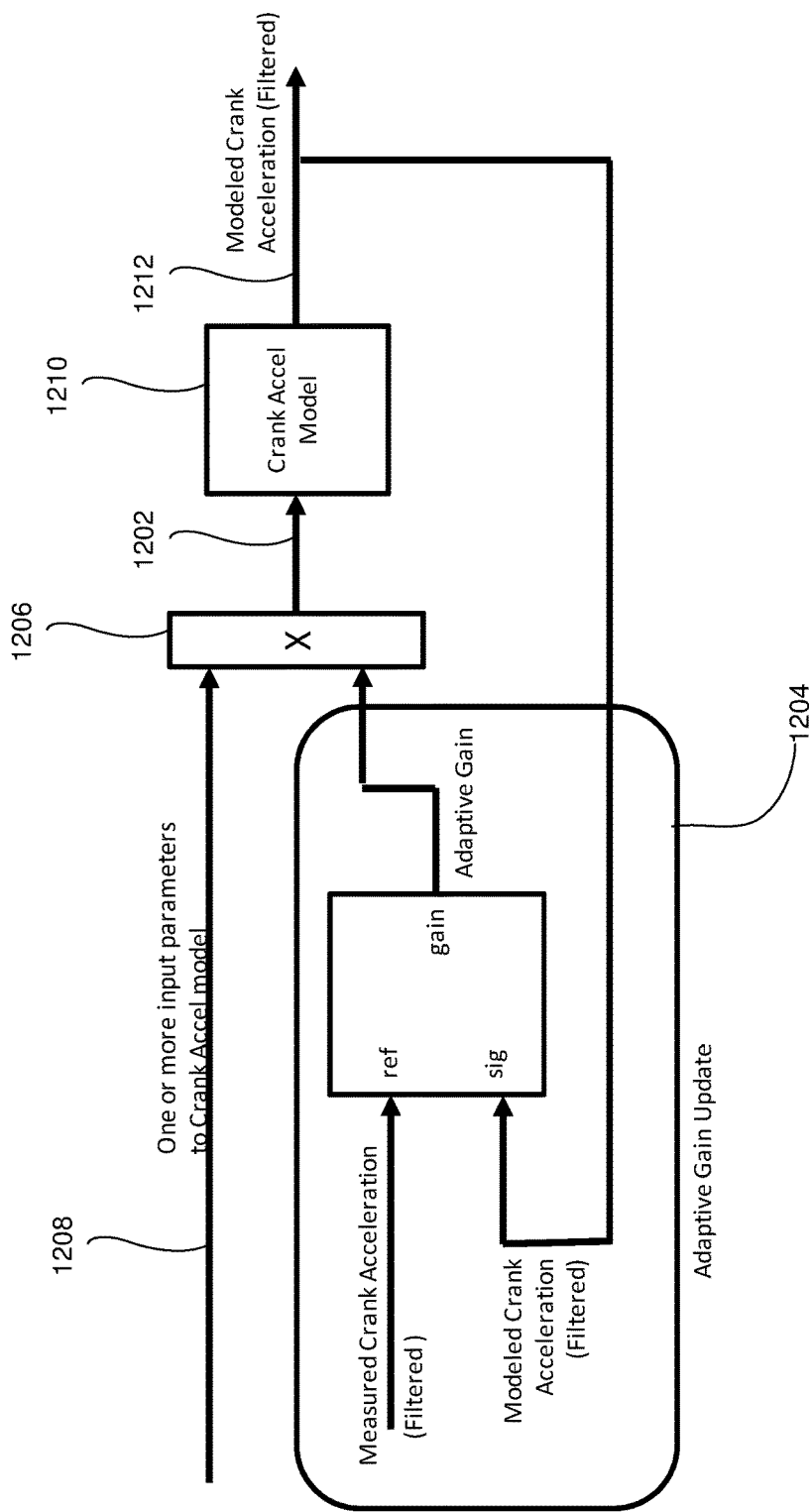
FIG. 12 is a flow diagram illustrating a technique for using an adaptive model according to a particular embodiment of the present invention.

The adjustment of the model may be performed in any suitable manner A particular embodiment is illustrated in FIG. 12. FIG. 12 is a flow diagram illustrating how an adaptive model may be used to estimate a change in crankshaft acceleration during a particular window. The diagram indicates various calculations that can be performed to generate the estimate (e.g., step 408.) Section 1204 of the flow diagram compares one or more past measurements of changes in crankshaft acceleration (e.g., step 406) and one or more past estimates of the changes in crank acceleration based on the model (e.g., step 408). At multiplier block 1206, a suitable multiplier is applied to one or more Crank Accel model input parameters 1208 based on the comparison. The adjusted modeled inputs 1202 may be used in the model 1210 to yield an adjusted modeled crank acceleration 1212. Filtered adjusted modeled crank acceleration 1212 may be used as a feedback signal to section 1204 and used in a misfire detection algorithm, for example the algorithm depicted in FIG. 9.

In addition to a skip fire controlled engine, the methods and arrangements described here are applicable to other engine control methods that may have significantly different torque signatures associated with sequential firing opportunities. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. These control methods and arrangements are described in more detail in U.S. Pat. No. 9,689,327, which is incorporated herein by reference in its entirety for all purposes.

As noted earlier, the pressure model described herein is applicable to many types of engine cycles, including, for example, a Miller or Atkinson cycle where cylinder air charge is reduced by either an early intake valve closing (EIVC) or late intake valve closing (LIVC). The model is thus applicable to dynamic firing level modulation controlled engines, where either multi-stage cam lift profiles or variable cam timing are used on different firing opportunities to induct differing amount of mass air charge into the cylinders. Relevant parameters for each cam profile can be incorporated in the pressure model. Additionally, variations in combustion stoichiometry, such as some firing opportunities using a lean burn air-fuel ratio may be included in the pressure model. Depending on the thermodynamic cycle, the thermodynamic state at IVC, such as $P_{IVC}$ (pressure at IVC) and $T_{IVC}$ (temperature at IVC) will be different modifying the shape of the P-V diagram shown in FIG. 6. The reference state at WC may be determined from experimental data by, for example, using a neural network or other machine learning approach that may include regression analysis to help determine the statistical relationship between the various model parameters. It should be appreciated that many of the variables used in Equations (1-9) such as, but not limited to, fuel mass, total fuel and air mass, combustion parameter alpha, start of combustion, combustion duration, and/or conversion efficiency may be different depending on the type of combustion cycle.

The described methods and arrangements may also be integrated into a hybrid powertrain where the crankshaft may be driven by a combination of an internal combustion engine and some auxiliary power source, such as an electric motor. In general, the auxiliary power source may at various times add or subtract torque from the powertrain crankshaft depending on the control settings. For example, an electric motor/generator may at times be used as an electric generator to store energy drawn from the powertrain in an energy storage device such as a capacitor or a battery, and may at times be used as an electric motor drawing energy from the energy storage device and adding torque to the powertrain.

Figure 13:
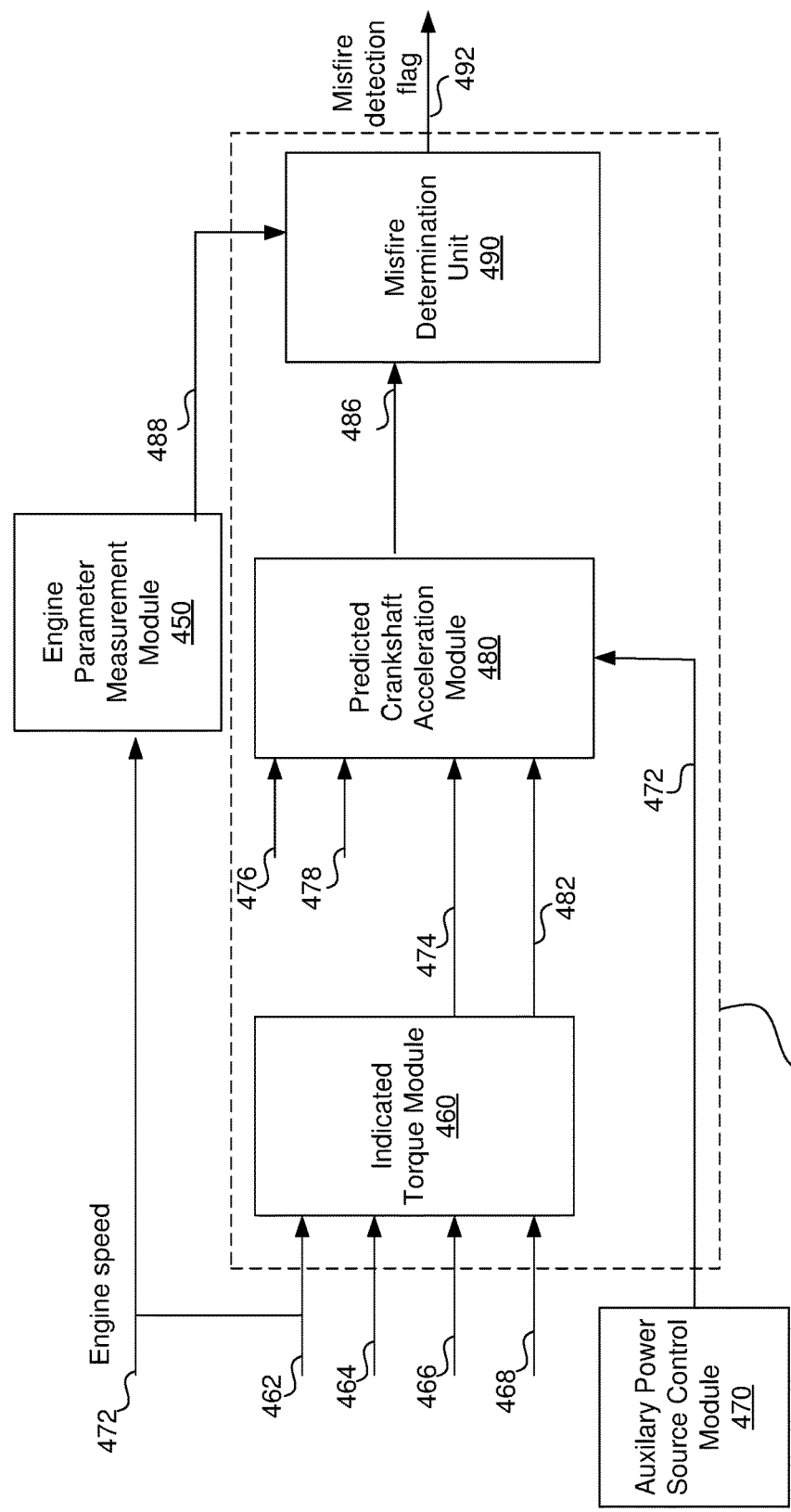
FIG. 13 is a block diagram of a misfire detection system including an auxiliary power source according to a particular embodiment of the present invention.

To include an auxiliary power source in a misfire detection system FIG. 4, can be modified to include such an additional torque source/sink. The resultant misfire detection system is shown in FIG. 13. A signal 472 from an auxiliary power source control module 470 is directed into the predicted crankshaft acceleration module 480. The signal 472 is a time or crank angle based estimate of the torque added or subtracted from the crankshaft by the auxiliary power source.

To model the impact of the auxiliary power source on crankshaft rotation, some of the preceding equations used to predict a misfire may be modified to include the impact of an auxiliary power source on the crankshaft rotation. For example, a term representing the auxiliary power source torque, such as an electric motor/generator torque ($L_{mt}(\theta)$), may be added to Equation (15) yielding Equation (25).

$$j_{eq}\ddot{\theta}+M_{eq}r^2[f_1(\theta)\ddot{\theta}+f_2(\theta)\dot{\theta}^2]f_3(\theta)=T_i(\theta)-T_{fp}(\theta)-T_L(\theta)+T_{mt}(\theta) \quad (25)$$

Equation (25) for the predicted crankshaft angular acceleration may be solved in an analogous manner to that previously described for Equation (15) to yield Equation (26), which is analogous to Equation (20) with the addition of the auxiliary power source torque.

$$\ddot{\theta} = \frac{1}{J_{eq} + M_{eq}r^2 f_1 f_3}\left[-M_{eq}r^2 f_2 f_3 \dot{\theta}^2 + T_i(\theta) - T_{fp}(\theta) - T_L(\theta) + T_{mt}(\theta)\right] \quad (26)$$

As described earlier, the predicted crank acceleration 486 obtained by the Predicted Crankshaft Acceleration Module 480 using the model described above may be compared with the measured crank angular acceleration 488 determined by the Engine Parameter Measurement Module 206 (e.g., step 106 of FIG. 1). In this case the impact of the auxiliary power source on an engine parameter in the target window must be included in step 106 of FIG. 1 in addition to the impact of internal combustion engine. The engine parameter may be crankshaft acceleration. If the predicted crankshaft angular acceleration 486 and the measured crankshaft angular acceleration, or some factor based on the two quantities, differ by more than a predefined threshold, the misfire detection system may determine that a misfire has occurred. Similarly, if the two quantities, or some factor based on the two quantities, are within a predefined threshold, the misfire detection may determine that no misfire has occurred.

The described methods and arrangements may be integrated into any suitable skip fire engine control system. It should be appreciated that the described misfire detection system 200 may include additional components, features or modules that are not show in FIG. 2. For example, the firing sequences generated by the firing timing determination module 202 may be based on a firing fraction. In some embodiments, the misfire detection system 200 includes a firing fraction calculator that determines this firing fraction based on a desired torque. A wide variety of firing fraction calculators, firing timing determination modules, powertrain parameter adjusting modules, ECUs, engine controller and other modules are described in co-assigned U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/953,615; 13/886,107; 13/963,759; 13/963,819; 13/961,701; 13/963,744; 13/843,567; 13/794,157; 13/842,234; 13/004,839, 13/654,244 and 13/004,844; and U.S. Provisional Patent Application Nos. 61/080,192; 61/104,222; and 61/640,646, each of which is incorporated herein by reference in its entirety for all purposes. Various engine diagnostic and misfire detection techniques are described in U.S. Provisional Patent Application Nos. 61/799,180 and 61/002,762 and U.S. patent application Ser. No. 14/207,109, which are also incorporated herein by reference in their entirety for all purposes. Any of the features, modules and operations described in the above patent documents may be added to the illustrated misfire detection system 200. In various alternative implementations, these functional blocks may be accomplished algorithmically using a microprocessor, ECU or other computation device, using analog or digital components, using programmable logic, using combinations of the foregoing and/or in any other suitable manner Any and all of the described components may be arranged to refresh their determinations/calculations very rapidly. In some preferred embodiments, these determinations/calculations are refreshed on a firing opportunity by firing opportunity basis although that is not a requirement. In some embodiments, for example, the described engine parameter change measurements, the adaptive adjustment of a model (e.g., step 410 of FIG. 4) and the misfire/engine error determinations are performed on a firing opportunity by firing opportunity basis. An advantage of firing opportunity by firing opportunity operation of the various components is that it makes the controller very responsive to changed inputs and/or conditions. Although firing opportunity by firing opportunity operation is very effective, it should be appreciated that the various components can be refreshed more slowly while still providing good control (e.g., the determinations/calculations may be performed every revolution of the crankshaft, every one or more working cycles, etc.).

The invention has been described primarily in the context of detecting misfire in the skip fire operation of 4-stroke piston engines suitable for use in motor vehicles. However, it should be appreciated that the described misfire detection approaches are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

In some embodiments, the firing timing determination module utilizes sigma delta conversion to generate a skip fire firing sequence. Although it is believed that sigma delta converters are very well suited for use in this application, it should be appreciated that the modules may employ a wide variety of modulation schemes. For example, pulse width modulation, pulse height modulation, code division multiple access (CDMA) oriented modulation or other modulation schemes may be used to deliver the drive pulse signal. Some of the described embodiments utilize first order converters. However, in other embodiments higher order converters may be used. In still other embodiments, as described in some of the aforementioned patent documents, a firing sequence is selected from a library of predefined firing sequences.

It should be also appreciated that any of the operations described herein may be stored in a suitable computer readable medium in the form of executable computer code. The operations are carried out when a processor executes the computer code. Such operations include but are not limited to any and all operations performed by the firing timing determination module 202, the firing control unit 204, the engine parameter measurement module 206, the misfire detection module 208, the misfire detection system 200, or any other module, component or controller described in this application.

The described embodiments work well with skip fire engine operation. In some implementations, working chambers are fired under close to optimal conditions. That is, the throttle may be kept substantially open and/or held at a substantially fixed positioned and the desired torque output is met by varying the firing frequency. In some embodiments, during the firing of working chambers the throttle is positioned to maintain a manifold absolute pressure greater than 70, 80, 90 or 95 kPa.

In some embodiments, the above techniques make use of the actual firing history of the cylinders so that only fired cylinders are actually considered by the misfire detection system. That is, when a cylinder is skipped, no effort is made to detect a misfire event with respect to that specific cylinder (e.g., the method of FIG. 1 is applied such that the target firing opportunity always involves a target working chamber that was arranged to be fired during the assigned window and not skipped.) In this way, the lack of the acceleration peaks during the timeslots associated with the missed firing opportunities will not be interpreted as misfires of the associated cylinders.

Various embodiments of the invention have been primarily described in the context of a skip fire control arrangement in which cylinders are deactivated during skipped working cycles by deactivating both the intake and exhaust valves in order to prevent air from being pumped through the cylinders during skipped working cycles. However, it should be appreciated that some skip fire valve actuation schemes contemplate deactivating only exhaust valves, or only the intake valves to effectively deactivate the cylinders and prevent the pumping of air through the cylinders. Several of the described approaches work equally well in such applications. Further, although it is generally preferable to deactivate cylinders, and thereby prevent the passing of air through the deactivated cylinders during skipped working cycles, there are some specific times when it may be desirable to pass air through a cylinder during a selected skipped working cycle. By way of example, this may be desirable when engine braking is desired and/or for specific emissions equipment related diagnostic or operational requirements. The described valve control approaches work equally well in such applications.

Various implementations of the invention are very well suited for use in conjunction with dynamic skip fire operation in which an accumulator or other mechanism tracks the portion of a firing that has been requested, but not delivered, or that has been delivered, but not requested such that firing decisions may be made on a firing opportunity by firing opportunity basis. However the described techniques are equally well suited for use in virtually any skip fire application (operational modes in which individual cylinders are sometimes fired and sometime skipped during operation in a particular operational mode) including skip fire operation using fixed firing patterns or firing sequences as may occur when using rolling cylinder deactivation and/or various other skip fire techniques. Similar techniques may also be used in variable stroke engine control in which the number of strokes in each working cycle are altered to effectively vary the displacement of an engine.

Although only a few embodiments of the invention have been described in detail, it should be appreciated that the invention may be implemented in many other forms without departing from the spirit or scope of the invention. FIGS. 1 and 4, for example, illustrate a number of steps in a method for detecting misfire or other engine errors. It should be appreciated that these operations need not take place in the illustrated order, and one or more steps may be modified, reordered, removed or replaced. There are also several references to the term, "cylinder." It should be understood that the term cylinder should be understood as broadly encompassing any suitable type of working chamber. Therefore, the present embodiments should be considered illustrative and not restrictive and the invention is not to be limited to the details given herein.

What is claimed is:

1. A method for detecting misfire in an engine, the engine having a plurality of working chambers and being operated in a skip fire manner, the method comprising:
    assigning a window to a target firing opportunity;
    attempting to fire a target working chamber during the target firing opportunity;
    measuring a change in an engine parameter during the target firing opportunity;
    using a multi-cylinder pressure model to help determine an expected change in the engine parameter during the target firing opportunity wherein the pressure model involves estimating pressure in a skipped working chamber, wherein the determination of the expected change in the engine parameter accounts for torque added or subtracted from the powertrain by an auxiliary power source;
    based on a comparison between the expected change and the measured change, determining whether the target working chamber misfired.

2. A method as recited in claim 1 wherein the engine parameter is crankshaft acceleration.

3. A method as recited in claim 1 wherein the multi-cylinder pressure model involves modeling pressure within each working chamber during a time period between intake valve closure and exhaust valve opening of the target firing opportunity.

4. A method as recited in claim 1 wherein the pressure model takes into account at least one selected from the group consisting of a rise of temperature in a working chamber due to combustion, fuel mass used to fuel combustion, energy conversion efficiency, ignition timing, residual fraction, leakage rate, fuel properties such as heating value, and total mass of mixture in a working chamber.

5. A method as recited in claim 1 further comprising using the pressure model to determine an expected torque generated by the working chambers of the engine during the target firing opportunity.

6. A method as recited in claim 1 wherein the determination of the misfire is based at least in part on A, B and A' wherein A is the expected change in the engine parameter based on the model, A' is one of an expected change in the engine parameter based on mass air charge and a low-pass filtered mean of A and B is the measured change in the engine parameter.

7. A method as recited in claim 1 further comprising:
    detecting a first offset between the estimated expected change and the measured change in the engine parameter;
    adjusting the pressure model based on the first offset; and
    repeating the pressure model usage and measurement operations, thereby providing a second expected change and a second measured change in the engine parameter wherein a second offset between the second expected change and the second measured change is reduced relative to the first offset as a result of the model adjustment.

8. A method as recited in claim 1 wherein the auxiliary power source is an electric motor/generator.

9. A misfire detection system for determining whether a particular working chamber in an engine has misfired, the engine being operated in a skip fire manner, the misfire detection system comprising:
    an engine parameter measurement module that is arranged to:
        assign a window to a target firing opportunity; and
        measure a change in an engine parameter during the target firing opportunity; and
    a misfire detection module that is arranged to:
        use a pressure model to help determine an expected change in the engine parameter during the target firing opportunity wherein the pressure model involves estimating pressure in a skipped working chamber, wherein the determination of the expected change in the engine parameter accounts for torque added or subtracted from the powertrain by an auxiliary power source; and
determine whether the target working chamber misfired based on a comparison between the expected change and the measured change.

10. A misfire detection system as recited in claim 9 wherein the engine parameter is crankshaft acceleration.

11. A misfire detection system as recited in claim 9 wherein the pressure model involves modeling pressure within a working chamber during a time period between intake valve closure and exhaust valve opening.

12. A misfire detection system as recited in claim 9 wherein the multi-cylinder pressure model takes into account at least one selected from the group consisting of a rise of temperature in a working chamber due to combustion, fuel mass used to fuel combustion, energy conversion efficiency, ignition timing, residual fraction, leakage rate, fuel properties such as heating value, and total mass of mixture in a working chamber.

13. A misfire detection system as recited in claim 9 wherein the misfire detection module is further arranged to determine an expected torque generated by the working chambers of the engine during the firing opportunity.

14. A misfire detection system as recited in claim 9 wherein the misfire determination is based at least in part on A, B and A' wherein A is the expected change in the engine parameter based on the model, A' is one of a low-pass filtered mean of A and an expected change in the engine parameter based on mass air charge, and B is the measured change in the engine parameter.

15. A misfire detection system as recited in claim 9 wherein the misfire detection module is further arranged to:
detect a first offset between the estimated expected change and the measured change in the engine parameter;
adjust the pressure model based on the first offset; and
repeat the pressure model usage and measurement operations, thereby providing a second expected change and a second measured change in the engine parameter wherein a second offset between the second expected change and the second measured change is reduced relative to the first offset as a result of the model adjustment.

16. A misfire detection system as recited in claim 9 wherein the auxiliary power source is an electric motor/generator.

17. A method for detecting misfire in an engine, the engine having a plurality of working chambers and being operated in a dynamic firing level modulation manner, the method comprising:
assigning a window to a target firing opportunity;
attempting to fire a target working chamber during the target firing opportunity;
measuring a change in an engine parameter during the target firing opportunity;
using a multi-cylinder pressure model to help determine an expected change in the engine parameter during the target firing opportunity wherein the pressure model involves estimating pressure in a skipped working chamber; and
based on a comparison between the expected change and the measured change, determining whether the target working chamber misfired.

18. A method as recited in claim 17 wherein a cam actuated intake valve controls air induction into a cylinder, the cam having a cam profile, and the multi-cylinder pressure model uses different inputs for different cylinders depending on the cam profile.

19. A method as recited in claim 17 wherein the model of the expected change in the engine parameter during the target firing opportunity accounts for torque added to or subtracted from the powertrain by an auxiliary power source.

20. A method as recited in claim 17 wherein the method is performed during dynamic multi-charge level operation of the engine.

21. A method as recited in claim 17 wherein the method is performed during multi-level skip fire operation of the engine.

22. A misfire detection system for determining whether a particular working chamber in an engine has misfired, the engine being operated in a dynamic firing level modulation manner, the misfire detection system comprising:
an engine parameter measurement module that is arranged to:
assign a window to a target firing opportunity; and
measure a change in an engine parameter during the target firing opportunity; and
a misfire detection module that is arranged to:
use a pressure model to help determine an expected change in the engine parameter during the target firing opportunity wherein the pressure model involves estimating pressure in a skipped working chamber; and
determine whether the target working chamber misfired based on a comparison between the expected change and the measured change.

23. A misfire detection system as recited in claim 22 wherein a cam actuated intake valve controls air induction into a cylinder, the cam having a cam profile, and the multi-cylinder pressure model uses different inputs for different cylinders depending on the cam profile.

24. A misfire detection system as recited in claim 22 wherein the model of the expected change in the engine parameter during the target firing opportunity accounts for torque added to or subtracted from the powertrain by an auxiliary power source.

25. A misfire detection system as recited in claim 22 arranged to detect misfires during multi-charge level operation of the engine.

26. A misfire detection system as recited in claim 22 arranged to detect misfires during multi-level skip fire operation of the engine.

* * * * *

UNITED STATES PATENT AND TRADEMARK OFFICE
CERTIFICATE OF CORRECTION

PATENT NO. : 10,088,388 B2
APPLICATION NO. : 15/701155
DATED : October 2, 2018
INVENTOR(S) : Chen et al.

It is certified that error appears in the above-identified patent and that said Letters Patent is hereby corrected as shown below:

In the Specification

1. Column 7, Line 41, insert --be-- after "may".

2. Column 8, Line 2, change "CrankshaftAngularAcceleation" to --CrankshaftAngularAcceleration--.

3. Column 11, Line 50, change "$p(\theta) = (1 = PR(\theta)) \cdot p_c(\theta) + PR(\theta) \cdot p_e(\theta)$" to --$p(\theta) = (1 - PR(\theta)) \cdot p_c(\theta) + PR(\theta) \cdot p_e(\theta)$--.

4. Column 12, Line 28, change "$T_1(\theta) = \Sigma_{Namcyl} T_{cyl,i}(\theta)$" to --$T_1(\theta) = \Sigma_{Numcyl} T_{cyl,i}(\theta)$--.

5. Column 12, Line 63, change "$J_{sq}$" to --$J_{eq}$--.

6. Column 12, Line 65, change "$M_{sq}$" to --$M_{eq}$--.

7. Column 13, Line 9, change "angle e" to --angle $\theta$--.

8. Column 13, Line 10, change "$M_{sq}$" to --$M_{eq}$--.

9. Column 13, Line 16, change "$J_{sq}$" to --$J_{eq}$--.

10. Column 13, Line 21, change "$T_{tCC}$" to -- $T_{tcc}$--.

11. Column 13, Line 23, change "$K_{tCC}$" to --$K_{tcc}$--.

12. Column 13, Line 38, change "$T_{tCC}$" to --$T_{tcc}$--.

13. Column 18, Line 9, change "stoichiometery" to --stoichiometry--.

Signed and Sealed this
Nineteenth Day of February, 2019

Andrei Iancu
*Director of the United States Patent and Trademark Office*